United States Patent
Behrisch et al.

(10) Patent No.: US 7,684,887 B2
(45) Date of Patent: Mar. 23, 2010

(54) ADVANCED PROCESS CONTROL METHOD AND ADVANCED PROCESS CONTROL SYSTEM FOR ACQUIRING PRODUCTION DATA IN A CHIP PRODUCTION INSTALLATION

(75) Inventors: Almuth Behrisch, Freising (DE); Thomas Darnhofer-Demar, München (DE); Hans-Peter Erb, Hohenschäftlam (DE)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 10/427,308

(22) Filed: Apr. 30, 2003

(65) Prior Publication Data
US 2004/0220688 A1 Nov. 4, 2004

(51) Int. Cl.
*G06F 19/00* (2006.01)

(52) U.S. Cl. .................. 700/110; 700/109; 700/121; 700/123

(58) Field of Classification Search .......... 700/121, 700/123; 714/48
See application file for complete search history.

(56) References Cited

U.S. PATENT DOCUMENTS

| | | | |
|---|---|---|---|
| 5,455,773 A | 10/1995 | Frey | |
| 5,777,876 A | 7/1998 | Beauchesne | |
| 5,859,964 A * | 1/1999 | Wang et al. | 714/48 |
| 6,263,255 B1 * | 7/2001 | Tan et al. | 700/121 |
| 6,427,093 B1 * | 7/2002 | Toprac | 700/121 |
| 6,442,496 B1 * | 8/2002 | Pasadyn et al. | 702/83 |
| 6,449,524 B1 * | 9/2002 | Miller et al. | 700/121 |
| 6,470,230 B1 * | 10/2002 | Toprac et al. | 700/121 |
| 6,484,064 B1 * | 11/2002 | Campbell | 700/100 |
| 6,535,774 B1 * | 3/2003 | Bode et al. | 700/109 |
| 6,549,822 B1 * | 4/2003 | Toprac | 700/121 |
| 6,556,884 B1 * | 4/2003 | Miller et al. | 700/121 |
| 6,560,506 B2 * | 5/2003 | Toprac | 700/121 |
| 6,563,300 B1 * | 5/2003 | Jackson et al. | 324/158.1 |

FOREIGN PATENT DOCUMENTS

| | | |
|---|---|---|
| DE | 4310332 | 10/1994 |
| DE | 19745386 | 8/1998 |
| DE | 19807343 | 9/1998 |
| GB | 2323950 | 10/1998 |

OTHER PUBLICATIONS

"USOC Standard Document Exchange Interface" -Control Systems International; CSI Document No. K-9306-APP-4-MKTG-01052003-MJK.*

* cited by examiner

*Primary Examiner*—Michael D Masinick
(74) *Attorney, Agent, or Firm*—Altera Law Group, LLC

(57) ABSTRACT

For monitoring production data, a grouping table in which machines are grouped into machine groups, machine components are grouped into machine component groups, chip manufacturing recipes are grouped into recipe groups or chip manufacturing parameters are grouped into parameter groups is used, whereby a considerable improvement in the comparability of the production data to be monitored is achieved.

5 Claims, 32 Drawing Sheets

Raw data recording (single-chamber installations: files per machine)

FIG 6

Lotnumber, Operation, Technology, Recipe

| | 602 | 603 | 604 | 605 | 606 |
|---|---|---|---|---|---|
| LOGISTICS_1 | A_PPID=PCB.02.NEW.S1 | A_CASSETTE=2 | A_SLOT=04 | A_MID=ZA125057 | A_OPERATION= |
| LOGISTICS_2 | B_PPID=PCB.02.NEW.S1 | B_CASSETTE=2 | B_SLOT=05 | B_MID=ZA125057 | B_OPERATION= |
| LOGISTICS_3 | A_PPID=PCB.02.NEW.S1 | A_CASSETTE=2 | A_SLOT=06 | A_MID=ZA125057 | A_OPERATION= |
| LOGISTICS_4 | B_PPID=PCB.02.NEW.S1 | B_CASSETTE=2 | B_SLOT=07 | B_MID=ZA125057 | B_OPERATION= |
| LOGISTICS_5 | A_PPID=PCB.02.NEW.S1 | A_CASSETTE=2 | A_SLOT=08 | A_MID=ZA125057 | A_OPERATION= |
| LOGISTICS_6 | B_PPID=PCB.02.NEW.S1 | B_CASSETTE=2 | B_SLOT=09 | B_MID=ZA125057 | B_OPERATION= |
| LOGISTICS_7 | A_PPID=PCB.02.NEW.S1 | A_CASSETTE=2 | A_SLOT=10 | A_MID=ZA125057 | A_OPERATION= |
| LOGISTICS_8 | B_PPID=PCB.02.NEW.S1 | B_CASSETTE=2 | B_SLOT=11 | B_MID=ZA125057 | B_OPERATION= |
| LOGISTICS_9 | A_PPID=PCB.02.NEW.S1 | A_CASSETTE=2 | A_SLOT=12 | A_MID=ZA125057 | A_OPERATION= |
| LOGISTICS_10 | B_PPID=PCB.02.NEW.S1 | B_CASSETTE=2 | B_SLOT=13 | B_MID=ZA125057 | B_OPERATION= |
| LOGISTICS_11 | A_PPID=PCB.02.NEW.S1 | A_CASSETTE=2 | A_SLOT=14 | A_MID=ZA125057 | A_OPERATION= |
| LOGISTICS_12 | B_PPID=PCB.02.NEW.S1 | B_CASSETTE=2 | B_SLOT=15 | B_MID=ZA125057 | B_OPERATION= |
| LOGISTICS_13 | A_PPID=PCB.02.NEW.S1 | A_CASSETTE=2 | A_SLOT=16 | A_MID=ZA125057 | A_OPERATION= |
| LOGISTICS_14 | B_PPID=PCB.02.NEW.S1 | B_CASSETTE=2 | B_SLOT=17 | B_MID=ZA125057 | B_OPERATION= |
| LOGISTICS_15 | A_PPID=PCB.02.NEW.S1 | A_CASSETTE=2 | A_SLOT=18 | A_MID=ZA125057 | A_OPERATION= |
| LOGISTICS_16 | B_PPID=PCB.02.NEW.S1 | B_CASSETTE=2 | B_SLOT=19 | B_MID=ZA125057 | B_OPERATION= |
| LOGISTICS_17 | A_PPID=PCB.02.NEW.S1 | A_CASSETTE=2 | A_SLOT=25 | A_MID=ZA125057 | A_OPERATION= |

FIG 7

| HEADER_TAG | HEADER_VALUE | | | | | | |
|---|---|---|---|---|---|---|---|
| FORMAT | 2 | | | | | | |
| NUMBER_PASS | 1 | | | | | | |
| HEADER_OFFS | 284226 | | | | | | |
| DATA_OFFSET | 128 | | | | | | |
| END_OFFSET | 286194 | | | | | | |
| Time | A_LOGISTICS | B_LOGISTICS | Step_A | Step_B | Pressure_A | Pressure_B | RFReflo_A |
| 1 | 0 | 0 | 3 | 2 | 44 | 44 | 0 |
| 2 | 0 | 0 | 3 | 2 | 44 | 44 | 0 |
| 3 | 0 | 0 | 4 | 3 | 44 | 44 | 0 |
| 4 | 0 | 0 | 4 | 3 | 43 | 45 | 0 |
| 5 | 0 | 0 | 4 | 3 | 73 | 44 | 0 |
| 6 | 0 | 0 | 4 | 3 | 90 | 44 | 0 |
| 7 | 0 | 0 | 4 | 3 | 100 | 44 | 0 |
| 8 | 0 | 0 | 5 | 3 | 99 | 44 | 0 |
| 9 | 0 | 0 | 5 | 3 | 71 | 44 | 0 |
| 10 | 0 | 0 | 5 | 3 | 24 | 45 | 0 |
| 11 | 0 | 0 | 5 | 3 | 30 | 45 | 0 |
| 12 | 0 | 0 | 5 | 3 | 34 | 45 | 0 |
| 13 | 0 | 0 | 5 | 3 | 33 | 45 | 0 |
| 14 | 0 | 0 | 5 | 3 | 33 | 45 | 0 |
| 15 | 0 | 0 | 5 | 3 | 32 | 44 | 0 |
| 16 | 0 | 0 | 5 | 3 | 28 | 45 | 0 |
| 17 | 0 | 0 | 5 | 3 | 32 | 45 | 0 |
| 18 | 0 | 0 | 5 | 3 | 33 | 45 | 0 |

701 702 703 704 705 706 707

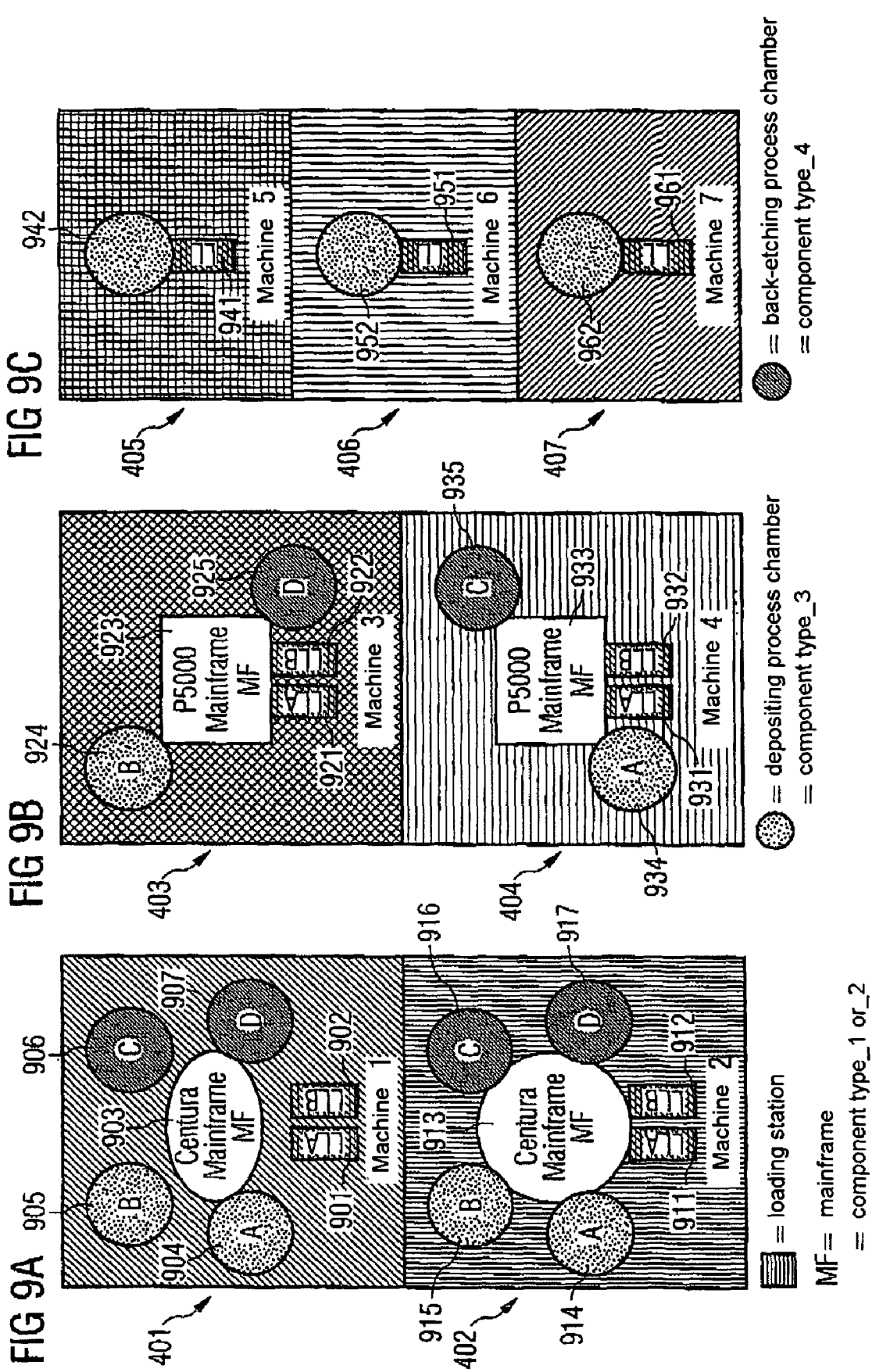

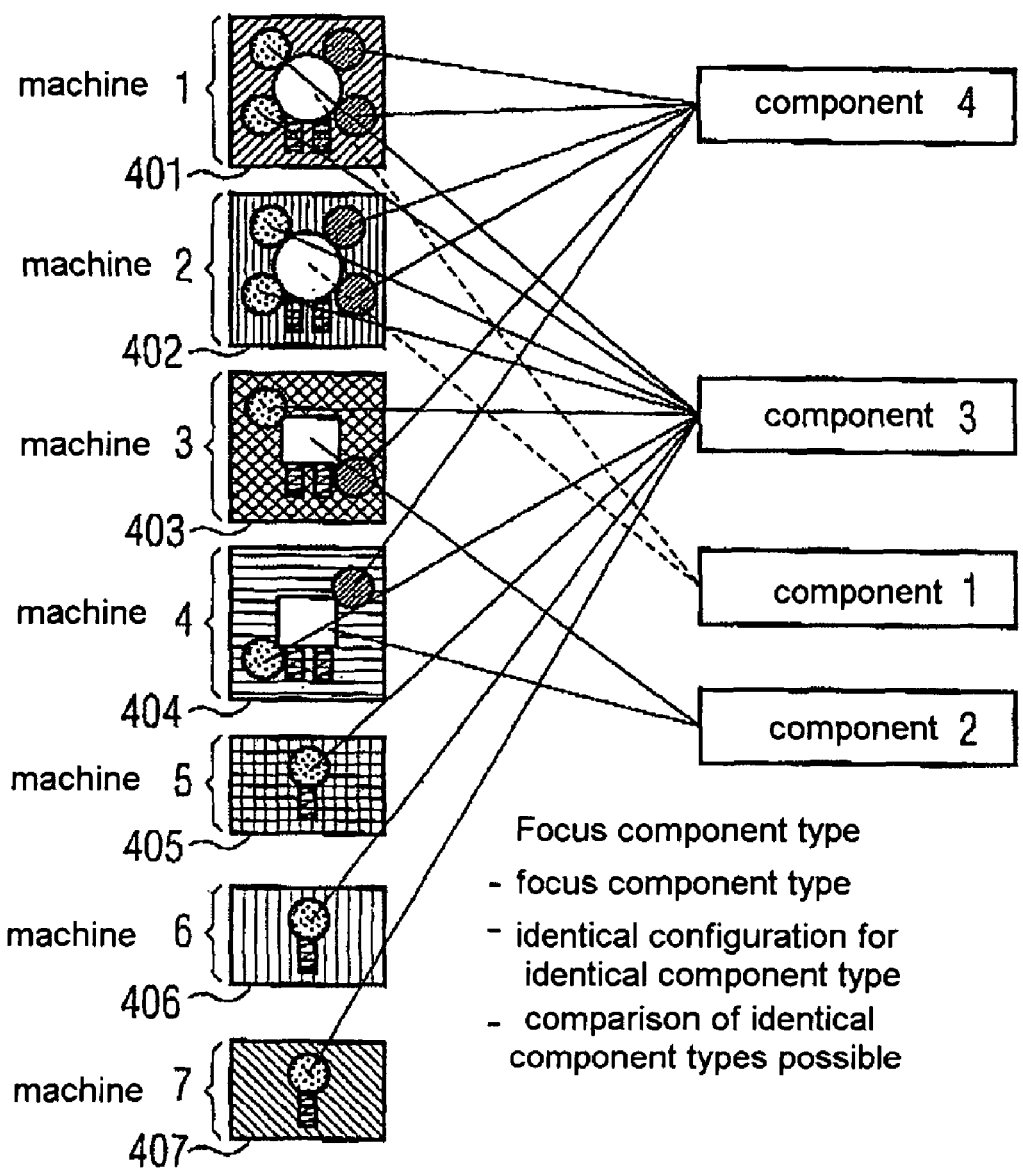

FIG 11

| Machines | Machine type | Component | Component type | Parameter set | Recipe set | Char. value set |
|---|---|---|---|---|---|---|
| Machine 1 | Type1 | MF | | Parameter set 1 | | Char. value set 1 |
| Machine 1 | Type1 | A | Component 1 ○ | Parameter set 4 | Recipe set 1 | Char. value set 2 |
| Machine 1 | Type1 | B | Component 3 | Parameter set 5 | Recipe set 2 | Char. value set 2 |
| Machine 1 | Type1 | C | Component 3 | Parameter set 6 | Recipe set 3 | Char. value set 3 |
| Machine 1 | Type1 | D | Component 4 | Parameter set 7 | Recipe set 3 | Char. value set 3 |
| Machine 2 | Type1 | MF | | Parameter set 1 | | Char. value set 1 |
| Machine 2 | Type1 | A | Component 1 ○ | Parameter set 4 | Recipe set 4 | Char. value set 2 |
| Machine 2 | Type1 | B | Component 3 | Parameter set 5 | Recipe set 4 | Char. value set 2 |
| Machine 2 | Type1 | C | Component 3 | Parameter set 8 | Recipe set 5 | Char. value set 3 |
| Machine 2 | Type1 | D | Component 4 | Parameter set 9 | Recipe set 5 | Char. value set 3 |
| Machine 3 | Type2 | MF | | Parameter set 2 | | Char. value set 1 |
| Machine 3 | Type2 | B | Component 2 □ | Parameter set 10 | Recipe set 6 | Char. value set 2 |
| Machine 3 | Type2 | D | Component 3 | Parameter set 11 | Recipe set 3 | Char. value set 3 |
| Machine 4 | Type2 | MF | | Parameter set 3 | | Char. value set 1 |
| Machine 4 | Type2 | A | Component 2 □ | Parameter set 12 | Recipe set 6 | Char. value set 2 |
| Machine 4 | Type2 | C | Component 4 | Parameter set 13 | Recipe set 3 | Char. value set 3 |
| Machine 5 | Type3 | F | Component 3 | Parameter set 14 | Recipe set 7 | Char. value set 2 |
| Machine 6 | Type3 | H | Component 3 | Parameter set 14 | Recipe set 7 | Char. value set 2 |
| Machine 7 | Type3 | I | Component 3 | Parameter set 15 | Recipe set 7 | Char. value set 2 |

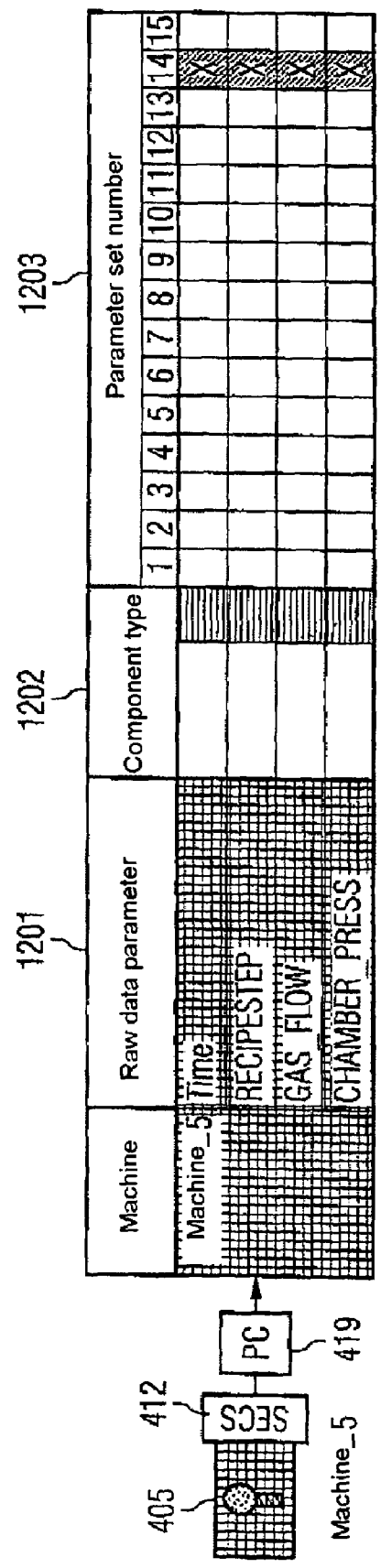
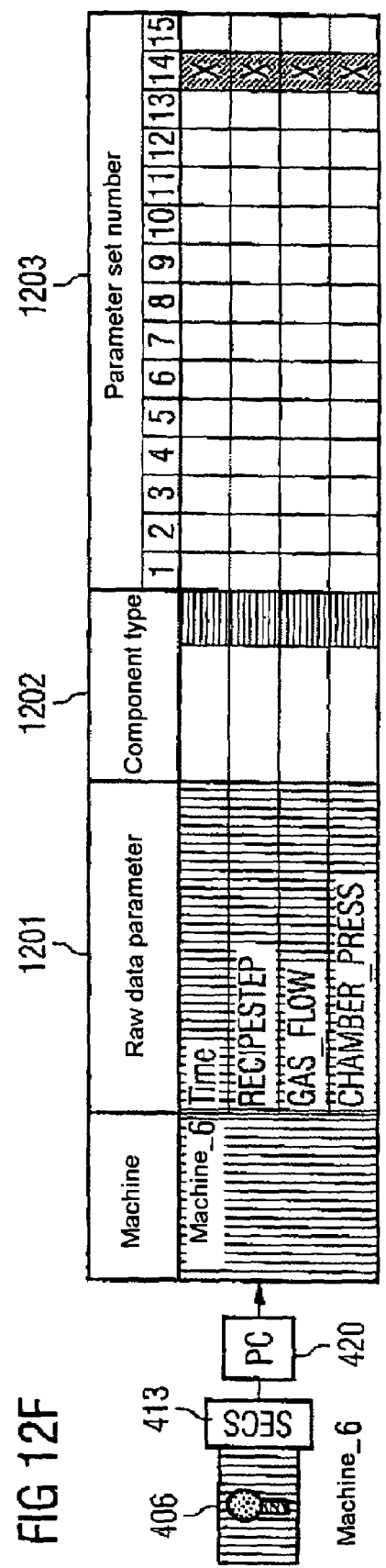
FIG 12E
FIG 12F

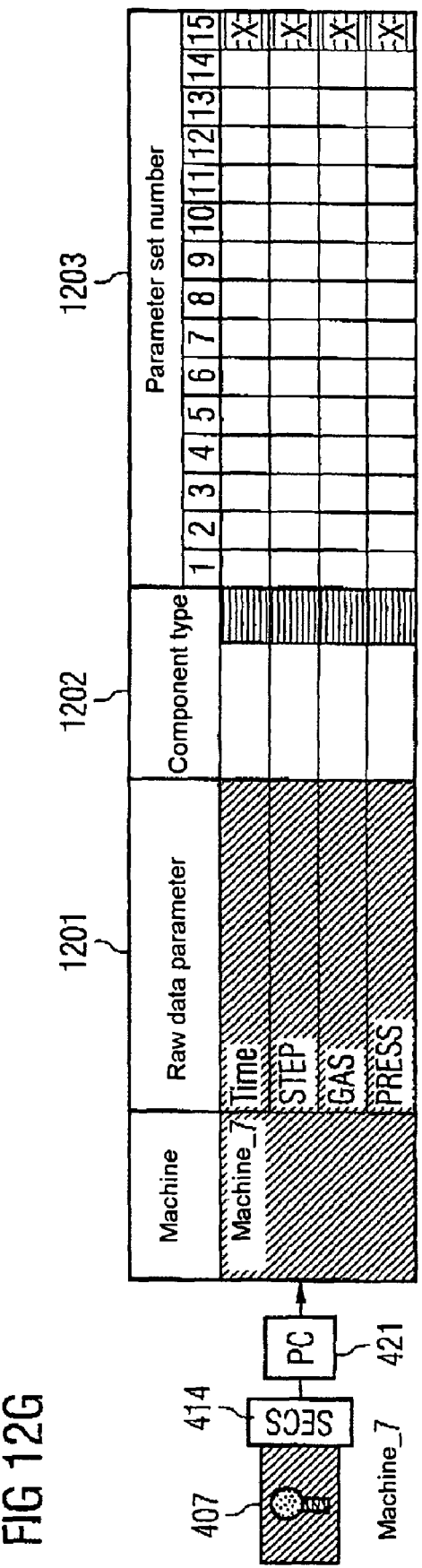

FIG 13 Raw data recording (assignment of the parameter sets) ~1300

| Machines | Machine type | Component | Component type | Parameter set | Recipe set | Char. value set |
|---|---|---|---|---|---|---|
| Machine_1 | Type_1 | MF | Component_1 | Parameter set_1 | Recipe set_1 | Char. value set_1 |
| Machine_1 | Type_1 | A | Component_3 | Parameter set_4 | Recipe set_2 | Char. value set_2 |
| Machine_1 | Type_1 | B | Component_3 | Parameter set_5 | Recipe set_2 | Char. value set_2 |
| Machine_1 | Type_1 | C | Component_4 | Parameter set_6 | Recipe set_3 | Char. value set_3 |
| Machine_1 | Type_1 | D | Component_4 | Parameter set_7 | Recipe set_3 | Char. value set_3 |
| Machine_2 | Type_1 | MF | Component_1 | Parameter set_1 | | Char. value set_1 |
| Machine_2 | Type_1 | A | Component_3 | Parameter set_4 | Recipe set_4 | Char. value set_2 |
| Machine_2 | Type_1 | B | Component_3 | Parameter set_5 | Recipe set_4 | Char. value set_2 |
| Machine_2 | Type_1 | C | Component_4 | Parameter set_8 | Recipe set_5 | Char. value set_3 |
| Machine_2 | Type_1 | D | Component_4 | Parameter set_9 | Recipe set_5 | Char. value set_3 |
| Machine_3 | Type_2 | MF | Component_2 | Parameter set_2 | | Char. value set_1 |
| Machine_3 | Type_2 | B | Component_3 | Parameter set_10 | Recipe set_6 | Char. value set_2 |
| Machine_3 | Type_2 | D | Component_4 | Parameter set_11 | Recipe set_6 | Char. value set_3 |
| Machine_4 | Type_2 | MF | Component_2 | Parameter set_3 | | Char. value set_1 |
| Machine_4 | Type_2 | A | Component_3 | Parameter set_12 | Recipe set_7 | Char. value set_2 |
| Machine_4 | Type_2 | C | Component_4 | Parameter set_13 | Recipe set_3 | Char. value set_3 |
| Machine_5 | Type_3 | - | Component_3 | Parameter set_14 | Recipe set_7 | Char. value set_2 |
| Machine_6 | Type_3 | - | Component_3 | Parameter set_14 | Recipe set_7 | Char. value set_2 |
| Machine_7 | Type_3 | - | Component_3 | Parameter set_15 | | Char. value set_2 |

Reduction of the parameter names:
machine group: 37 -> 13 parameters, chamber-subsuming: 15 -> 8 parameters
depositing: 19 -> 4 parameters, back-etching: 19 -> 4 parameters

FIG 14

Parameter configuration (component_1 and component_2 = two different mainframes)

| Parameter set | Equipment parameter | Pattern | Factor | APC parameter |
|---|---|---|---|---|
| Parameter set_1 | Time | Time | | Time |
| Parameter set_1 | 000_STEP_NUMBER_000 | 000 | | STEP_A |
| Parameter set_1 | 001_STEP_NUMBER_001 | 001 | | STEP_B |
| Parameter set_1 | 002_STEP_NUMBER_002 | 002 | | STEP_C |
| Parameter set_1 | 003_STEP_NUMBER_003 | 003 | | STEP_D |
| Parameter set_1 | 004_Transfer_Pres | 004 | | TRANSFER_PRESSURE |
| Parameter set_1 | 007_CHAMBER_PRESS | 006 | | PRESSURE_A |
| Parameter set_1 | 008_CHAMBER_PRESS | 008 | | PRESSURE_B |

| Parameter Set | Equipment parameter | Pattern | Factor | APC parameter |
|---|---|---|---|---|
| Parameter set_2 | Time | Time | | Time |
| Parameter set_2 | 01_STEP_NUMB_001 | 01 | | STEP_B |
| Parameter set_2 | 03_STEP_NUMB_003 | 03 | | STEP_D |
| Parameter set_2 | 04_Transf_Pres | 04 | 1000 | TRANSFER_PRESSURE |
| Parameter set_2 | 08_CHAMB_PRESS | 008 | 0.1 | PRESSURE_B |

| Parameter Set | Equipment parameter | Pattern | Factor | APC parameter |
|---|---|---|---|---|
| Parameter set_3 | Time | Time | | Time |
| Parameter set_3 | 00_STEP_NUMB_000 | 00 | | STEP_A |
| Parameter set_3 | 02_STEP_NUMB_002 | 02 | | STEP_C |
| Parameter set_3 | 04_Transf_Pres | 04 | | TRANSFER_PRESSURE |
| Parameter set_3 | 07_CHAMB_PRESS | 006 | | PRESSURE_A |

Reduction of the parameter names:
chamber-subsuming: 15 -> 8 parameters

Explanation of factor:

$$\text{APC Parameter} = \text{Equipment Parameter} \cdot \text{Factor}$$

| | |
|---|---|
| | =TIME |
| | =STEP_A |
| | =STEP_B |
| | =STEP_C |
| | =STEP_D |
| | =TRANSFER PRESSURE |
| | =PRESSURE_A |
| | =PRESSURE_B |

FIG 15A

Parameter configuration (component_3 depositing)

| Parameter set | Equipment parameter | Pattern | | Factor | APC parameter |
|---|---|---|---|---|---|
| Parameter set_4 | Time | Time | | | TIME |
| Parameter set_4 | 000_STEP_NUMBER_000 | 000 | | | STEP |
| Parameter set_4 | 005_GAS_FLOW_000 | 005 | | | GAS |
| Parameter set_4 | 007_CHAMBER_PRESS | 006 | | | PRESSURE |

| Parameter set | Equipment parameter | Pattern | | Factor | APC parameter |
|---|---|---|---|---|---|
| Parameter set_5 | Time | Time | | | TIME |
| Parameter set_5 | 001_STEP_NUMBER_001 | 001 | | | STEP |
| Parameter set_5 | 006_GAS_FLOW_001 | 006 | | | GAS |
| Parameter set_5 | 008_CHAMBER_PRESS | 008 | | | PRESSURE |

| Parameter set | Equipment parameter | Pattern | | Factor | APC parameter |
|---|---|---|---|---|---|
| Parameter set_10 | Time | Time | | | TIME |
| Parameter set_10 | 01_STEP_NUMB_001 | 001 | | | STEP |
| Parameter set_10 | 06_GAS_001 | 006 | | | GAS |
| Parameter set_10 | 08_CHAMB_PRESS | 008 | | | PRESSURE |

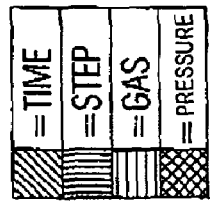

= TIME
= STEP
= GAS
= PRESSURE

Reduction of the parameter names:
depositing: 19 -> 4 parameter

Explanation of factor:

APC = Equipment • Factor
Parameter    Parameter

FIG 15B

Parameter configuration (component_3 = depositing)

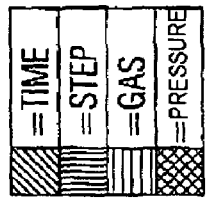

| Parameter set | Equipment parameter | Pattern | Factor | APC parameter |
|---|---|---|---|---|
| Parameter set_12 | Time | Time | | TIME |
| Parameter set_12 | 00_STEP_NUMB_000 | 000 | | STEP |
| Parameter set_12 | 05_GAS_000 | 005 | | GAS |
| Parameter set_12 | 07_CHAMB_PRESS | 006 | | PRESSURE |

| Parameter set | Equipment parameter | Pattern | Factor | APC parameter |
|---|---|---|---|---|
| Parameter set_14 | Time | Time | | TIME |
| Parameter set_14 | RECIPESTEP | RECIPESTEP | | STEP |
| Parameter set_14 | GAS_FLOW | GAS_FLOW | | GAS |
| Parameter set_14 | CHAMBER_PRESS | CHAMBER_PRESS | | PRESSURE |

| Parameter set | Equipment parameter | Pattern | Factor | APC parameter |
|---|---|---|---|---|
| Parameter set_15 | Time | Time | | TIME |
| Parameter set_15 | STEP | STEP | | STEP |
| Parameter set_15 | GAS | GAS | 10 | GAS |
| Parameter set_15 | PRESS | PRESS | 0.001 | PRESSURE |

Reduction of the parameter names:
depositing: 19 -> 4 parameters

Explanation of factor:
APC = Equipment • Factor
Parameter    Parameter

FIG 16A

Parameter configuration (component_4 = back-etching)

| Parameter set | Equipment parameter | Pattern | Factor | APC parameter |
|---|---|---|---|---|
| Parameter set_6 | Time | Time | | TIME |
| Parameter set_6 | 002 STEP NUMBER 002 | 002 | | STEP |
| Parameter set_6 | 009 RF FOREWARD | 009 | | POWER_FW |
| Parameter set_6 | 011 RF BACKWARD | 011 | | POWER_BW |

| Parameter set | Equipment parameter | Pattern | Factor | APC parameter |
|---|---|---|---|---|
| Parameter set_7 | Time | Time | | TIME |
| Parameter set_7 | 003 STEP NUMBER 003 | 003 | | STEP |
| Parameter set_7 | 010 RF FOREWARD | 010 | | POWER_FW |
| Parameter set_7 | 012 RF BACKWARD | 012 | | POWER_BW |

| Parameter set | Equipment parameter | Pattern | Factor | APC parameter |
|---|---|---|---|---|
| Parameter set_8 | Time | Time | | TIME |
| Parameter set_8 | 002 STEP NUMBER 002 | 002 | | STEP |
| Parameter set_8 | 013 RF FW | 013 | 10 | POWER_FW |
| Parameter set_8 | 015 RF BW | 015 | 10 | POWER_BW |

Legend:
- ▨ = TIME
- ▦ = STEP
- ▤ = POWER_FW
- ▥ = POWER_BW

Reduction of the parameter names:
back-etching: 19 -> 4 parameters

Explanation of factor:

APC = Equipment • Factor:
Parameter    Parameter

FIG 16B

Parameter configuration (component_4 = back-etching)

1400  1401  1402

| Parameter set | Equipment parameter | Pattern | Factor | APC parameter |
|---|---|---|---|---|
| Parameter set_9 | Time | Time | | TIME |
| Parameter set_9 | 003 STEP NUMBER 003 | 003 | | STEP |
| Parameter set_9 | 014 RF_FW | 014 | 10 | POWER FW |
| Parameter set_9 | 016 RF_BW | 016 | 10 | POWER BW |

| Parameter set | Equipment parameter | Pattern | Factor | APC parameter |
|---|---|---|---|---|
| Parameter set_11 | Time | Time | | TIME |
| Parameter set_11 | 03 STEP NUMBER 003 | 003 | | STEP |
| Parameter set_11 | 10 RF_FW | 010 | | POWER FW |
| Parameter set_11 | 12 RF_BW | 012 | | POWER BW |

| Parameter set | Equipment parameter | Pattern | Factor | APC parameter |
|---|---|---|---|---|
| Parameter set_13 | Time | Time | | TIME |
| Parameter set_13 | 02 STEP NUMB 002 | 002 | | STEP |
| Parameter set_13 | 09 RF_FW | 009 | | POWER FW |
| Parameter set_13 | 11 RF_BW | 011 | | POWER BW |

Legend:
- ▨ = TIME
- ☰ = STEP
- ▦ = POWER FW
- ▥ = POWER BW

Reduction of the parameter names:
back-etching: 19 -> 4 parameters

Explanation of factor:

APC = Equipment • Factor
Parameter   Parameter

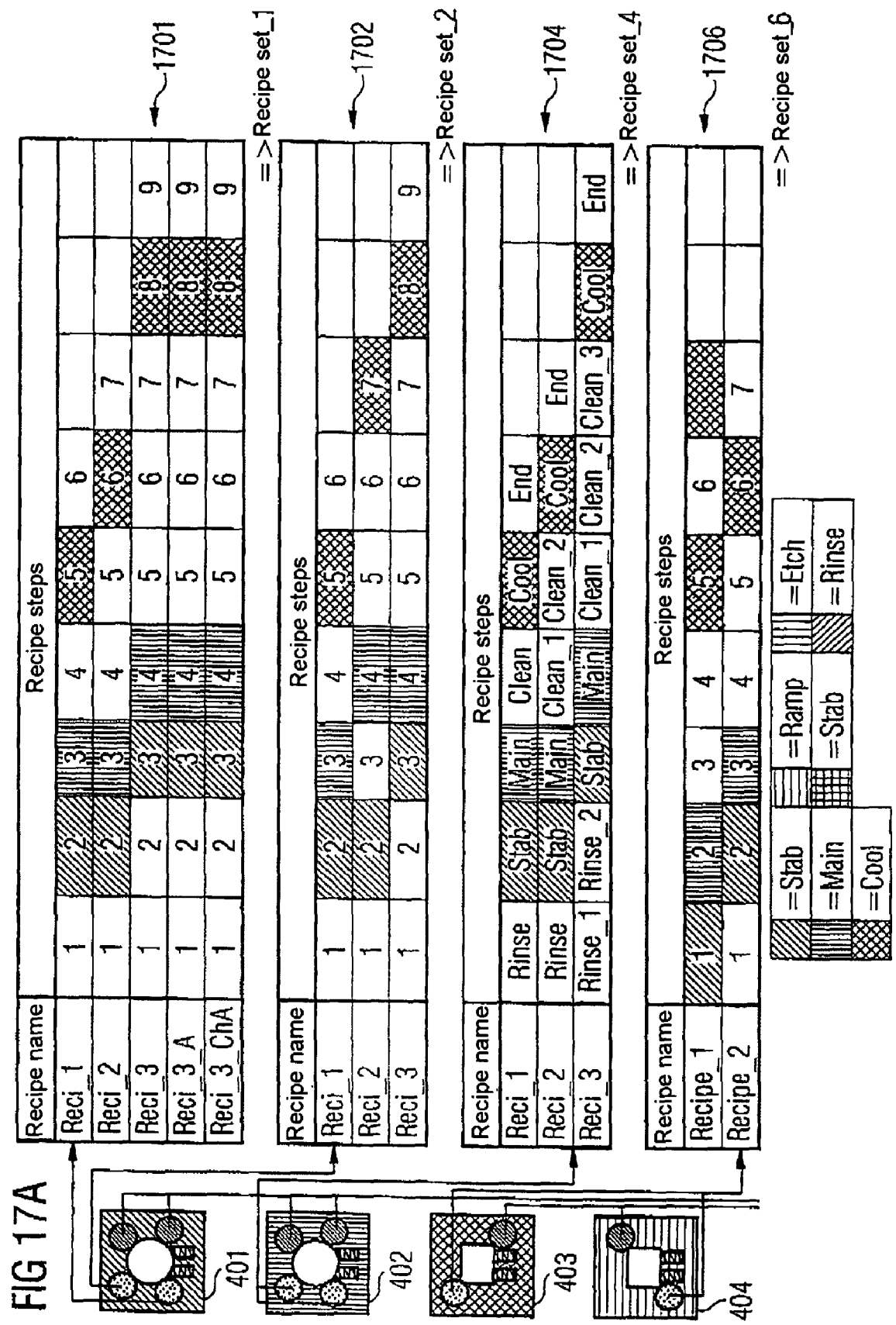

FIG 18

Recipe (assignment of the recipe sets)

| Machines | Machine type | Machine type | Component | Component type | Parameter set | Recipe set | Char. number set |
|---|---|---|---|---|---|---|---|
| Machine_1 | Type_1 | MF | | Component_1 | Parameter set_1 | Recipe set_1 | Char. number set_1 |
| Machine_1 | Type_1 | A | | Component_3 | Parameter set_4 | Recipe set_1 | Char. number set_1 |
| Machine_1 | Type_1 | B | | Component_3 | Parameter set_5 | Recipe set_2 | Char. number set_2 |
| Machine_1 | Type_1 | C | | Component_4 | Parameter set_6 | Recipe set_3 | Char. number set_3 |
| Machine_1 | Type_1 | D | | Component_4 | Parameter set_7 | Recipe set_3 | Char. number set_3 |
| Machine_2 | Type_1 | MF | | Component_1 | Parameter set_1 | Recipe set_4 | Char. number set_1 |
| Machine_2 | Type_1 | A | | Component_3 | Parameter set_4 | Recipe set_4 | Char. number set_1 |
| Machine_2 | Type_1 | B | | Component_3 | Parameter set_5 | Recipe set_5 | Char. number set_2 |
| Machine_2 | Type_1 | C | | Component_4 | Parameter set_8 | Recipe set_5 | Char. number set_2 |

1800

Reduction of the recipe names:
machine group: 18 -> 7 recipes
depositing: 10 -> 3 recipes, back-etching: 8 -> 4 recipes Reduction of the recipe step names by generalized recipe step names: machine group: 53 -> 7
depositing: 29 -> 3, back-etching: 24 -> 4

FIG 19
Recipe configuration (component_3 = depositing)

| Recipe set | Equipment recipe | APC recipe | Stab | Main | Cool | |
|---|---|---|---|---|---|---|
| Recipe set 1 | Reci_1 | Comp_3_Recipe_1 | 2 | 3 | 5 | |
| Recipe set 1 | Reci_2 | Comp_3_Recipe_2 | 2 | 3 | 6 | ←1901 |
| Recipe set 1 | Reci_3.* | Comp_3_Recipe_3 | 3 | 4 | 8 | |

| Recipe set | Equipment recipe | APC recipe | Stab | Main | Cool | |
|---|---|---|---|---|---|---|
| Recipe set 2 | Reci_1 | Comp_3_Recipe_1 | 2 | 3 | 5 | |
| Recipe set 2 | Reci_2 | Comp_3_Recipe_2 | 2 | 4 | 7 | ←1902 |
| Recipe set 2 | Reci_3 | Comp_3_Recipe_3 | 3 | 4 | 8 | |

| Recipe set | Equipment recipe | APC recipe | Stab | Main | Cool | |
|---|---|---|---|---|---|---|
| Recipe set 4 | Reci_1 | Comp_3_Recipe_1 | Stab | Main | Cool | |
| Recipe set 4 | Reci_2 | Comp_3_Recipe_2 | Stab | Main | Cool | ←1903 |
| Recipe set 4 | Reci_3 | Comp_3_Recipe_3 | Stab | Main | Cool | |

| Recipe set | Equipment recipe | APC recipe | Stab | Main | Cool | |
|---|---|---|---|---|---|---|
| Recipe set 6 | Recipe_1 | Comp_3_Recipe_1 | 1 | 2 | 5 | |
| Recipe set 6 | Recipe_2 | Comp_3_Recipe_2 | 2 | 3 | 6 | ←1904 |

| Recipe set | Equipment recipe | APC recipe | Stab | Main | Cool | |
|---|---|---|---|---|---|---|
| Recipe set 7 | R_1 | Comp_3_Recipe_1 | 2 | 4 | 5 | |
| Recipe set 7 | R_2 | Comp_3_Recipe_2 | 3 | 5 | 7 | ←1905 |
| Recipe set 7 | R_3 | Comp_3_Recipe_3 | 3 | 5 | 6 | |

Reduction of the recipe names:
depositing: 10 -> 3 recipes

Reduction of the recipe step names by generalized recipe step names
Depositing

Stab: 9 -> 1
Main: 10 -> 1
Cool: 10 -> 1

FIG 20

Recipe configuration (conponent_4 = back-etching)

| Recipe set | Equipment recipe | APC recipe | Ramp | Stab | Etch | Rinse |
|---|---|---|---|---|---|---|
| Recipe set_3 | 1_Reci | Comp_4_Recipe_1 | 2 | 4 | 5 | 6 |
| Recipe set_3 | 2_Reci | Comp_4_Recipe_2 | 3 | 5 | 7 | 9 |
| Recipe set_3 | 3_Reci | Comp_4_Recipe_3 | 3 | 5 | 6 | 8 |
| Recipe set_3 | 4_Reci | Comp_4_Recipe_4 | 2 | 3 | 5 | 7 |

⟵ 2001

| Recipe set | Equipment recipe | APC recipe | Ramp | Stab | Etch | Rinse |
|---|---|---|---|---|---|---|
| Recipe set_7 | 1_Recipe | Comp_4_Recipe_1 | 2 | 4 | 5 | 6 |
| Recipe set_7 | 2_Recipe | Comp_4_Recipe_2 | 3 | 5 | 7 | 9 |
| Recipe set_7 | 3_Recipe | Comp_4_Recipe_3 | 3 | 5 | 6 | 8 |
| Recipe set_7 | 4_Recipe | Comp_4_Recipe_4 | 2 | 3 | 5 | 7 |

⟵ 2002

Reduction of the recipe names:
Back-etching: 8 -> 4 recipes

Reduction of the recipe step names by generalized recipe step names:
Back-etching:

Ramp: 8 -> 1
Stab: 8 -> 1
Etch: 8 -> 1
Rinse: 8 -> 1

FIG 21

Characteristic values (assignment of the characteristic value sets)

| Machines | Machine type | Component | Component type | Parameter set | Recipe set | Char. number set |
|---|---|---|---|---|---|---|
| Machine_1 | Type_1 | MF | Component_1 | Parameter set_1 | | Char. number set_1 |
| Machine_1 | Type_1 | A | Component_3 | Parameter set_4 | Recipe set_1 | Char. number set_2 |
| Machine_1 | Type_1 | B | Component_3 | Parameter set_5 | Recipe set_2 | Char. number set_2 |
| Machine_1 | Type_1 | C | Component_4 | Parameter set_6 | Recipe set_3 | Char. number set_3 |
| Machine_1 | Type_1 | D | Component_4 | Parameter set_7 | Recipe set_3 | Char. number set_3 |
| Machine_2 | Type_1 | MF | Component_1 | Parameter set_1 | | Char. number set_1 |
| Machine_2 | Type_1 | A | Component_3 | Parameter set_4 | Recipe set_4 | Char. number set_2 |
| Machine_2 | Type_1 | B | Component_3 | Parameter set_5 | Recipe set_4 | Char. number set_2 |
| Machine_2 | Type_1 | C | Component_4 | Parameter set_8 | Recipe set_5 | Char. number set_3 |
| Machine_2 | Type_1 | D | Component_4 | Parameter set_9 | Recipe set_5 | Char. number set_3 |
| Machine_3 | Type_2 | MF | Component_2 | Parameter set_2 | | Char. number set_1 |
| Machine_3 | Type_2 | B | Component_3 | Parameter set_10 | Recipe set_6 | Char. number set_2 |
| Machine_3 | Type_2 | D | Component_4 | Parameter set_11 | Recipe set_3 | Char. number set_3 |
| Machine_4 | Type_2 | MF | Component_2 | Parameter set_3 | | Char. number set_1 |
| Machine_4 | Type_2 | A | Component_3 | Parameter set_12 | Recipe set_6 | Char. number set_2 |
| Machine_4 | Type_2 | C | Component_4 | Parameter set_13 | Recipe set_3 | Char. number set_3 |
| Machine_5 | Type_3 | - | Component_3 | Parameter set_14 | Recipe set_7 | Char. number set_2 |
| Machine_6 | Type_3 | - | Component_3 | Parameter set_14 | Recipe set_7 | Char. number set_2 |
| Machine_7 | Type_3 | - | Component_3 | Parameter set_15 | Recipe set_7 | Char. number set_2 |

Reduction of machine components to characteristic number sets:
Machine group: 19 -> 3, chamber-subsuming: 4 -> 1,
depositing: 9 -> 1, back-etching: 6 -> 1

Characteristic value configuration (component_1 and component_2 = two different mainframes)

| Char. value set | Characteristic value | Algorithm | APC parameter | Trigger on 1 | Trigger on 2 | Trigger on 3 | Trigger off 1 | Trigger off 2 | Trigger off 3 |
|---|---|---|---|---|---|---|---|---|---|
| Char. value set 1 | TIME_TRANS_AC | Range | TIME | STEP_A | > | 0 | STEP_C | > | 0 |
| Char. value set 1 | TIME_TRANS_AD | Range | TIME | STEP_A | > | 0 | STEP_D | > | 0 |
| Char. value set 1 | TIME_TRANS_BC | Range | TIME | STEP_B | > | 0 | STEP_C | > | 0 |
| Char. value set 1 | TIME_TRANS_BD | Range | TIME | STEP_B | > | 0 | STEP_D | > | 0 |
| Char. value set 1 | TIME_START_A_ENDE_C | Range | TIME | STEP_A | > | 0 | STEP_C | > | 0 |
| Char. value set 1 | TIME_START_A_ENDE_D | Range | TIME | STEP_A | > | 0 | STEP_D | > | 0 |
| Char. value set 1 | TIME_START_B_ENDE_C | Range | TIME | STEP_B | > | 0 | STEP_C | > | 0 |
| Char. value set 1 | TIME_START_B_ENDE_D | Range | TIME | STEP_B | > | 0 | STEP_D | > | 0 |
| Char. value set 1 | TRANSPRESSURE_TRANS_AC | Mean value | TRANSFER_PRESSURE | STEP_A | > | 0 | STEP_C | > | 0 |
| Char. value set 1 | TRANSPRESSURE_TRANS_AD | Mean value | TRANSFER_PRESSURE | STEP_A | > | 0 | STEP_D | > | 0 |
| Char. value set 1 | TRANSPRESSURE_TRANS_BC | Mean value | TRANSFER_PRESSURE | STEP_B | > | 0 | STEP_C | > | 0 |
| Char. value set 1 | TRANSPRESSURE_TRANS_BD | Mean value | TRANSFER_PRESSURE | STEP_B | > | 0 | STEP_D | > | 0 |
| Char. value set 1 | PRESSURE_TRANS_AC | Mean value | PRESSURE_A | STEP_A | > | 0 | STEP_C | > | 0 |
| Char. value set 1 | PRESSURE_TRANS_AD | Mean value | PRESSURE_A | STEP_A | > | 0 | STEP_D | > | 0 |
| Char. value set 1 | PRESSURE_TRANS_BC | Mean value | PRESSURE_B | STEP_B | > | 0 | STEP_C | > | 0 |
| Char. value set 1 | PRESSURE_TRANS_BD | Mean value | PRESSURE_B | STEP_B | > | 0 | STEP_D | > | 0 |

See parameter table

▨ =TIME  ▤ =STEP_B  ▦ =STEP_D  ▧ =PRESSURE_A
▩ =STEP_A  ▥ =STEP_C  ▨ =TRANSFER_PRESSURE  ▤ =PRESSURE_B 2200  16 characteristic values for characteristic value set_1 (no reduction)

FIG 23 Characteristic value configuration (component_3 = depositing)

| Char. value set | Characteristic value | Algorithm | APC parameter | Trigger on 1 | Trigger on 2 | Trigger on 3 | Trigger off 1 | Trigger off 2 | Trigger off 3 |
|---|---|---|---|---|---|---|---|---|---|
| Char. value set 2 | GAS-STAB | Mean value | GAS | STEP | = | Stab | STEP | <> | Stab |
| Char. value set 2 | GAS-STABS | Standard deviation | GAS | STEP | = | Stab | STEP | <> | Stab |
| Char. value set 2 | GAS-MAIN | Mean value | GAS | STEP | = | Main | STEP | <> | Main |
| Char. value set 2 | GAS-MAINS | Standard deviation | GAS | STEP | = | Main | STEP | <> | Main |
| Char. value set 2 | GAS-COOL | Mean value | GAS | STEP | = | Cool | STEP | <> | Cool |
| Char. value set 2 | GAS-COOLS | Standard deviation | GAS | STEP | = | Cool | STEP | <> | Cool |
| Char. value set 2 | PRESSURE-MAIN | Mean value | PRESSURE | STEP | = | Main | STEP | <> | Main |
| Char. value set 2 | PRESSURE-MAINS | Standard deviation | PRESSURE | STEP | = | Main | STEP | <> | Main |
| Char. value set 2 | TIME-MAIN | Range | TIME | STEP | = | Main | STEP | <> | Main |
| Char. value set 2 | TIME-RECIPE | Range | TIME | STEP | > | 0 | STEP | <= | 0 |

2300 ↗ 10 characteristic values for characteristic value set_2 (no reduction)

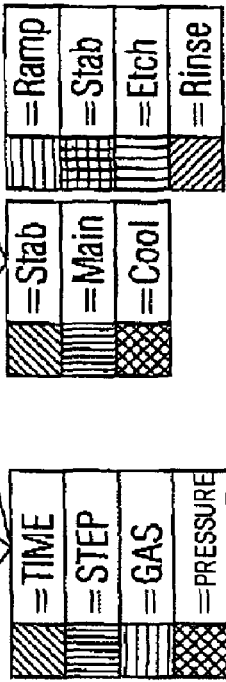

See parameter table:
=TIME
=STEP
=GAS
=PRESSURE

See recipe table:
=Stab =Ramp
=Main =Stab
=Cool =Etch
       =Rinse

FIG 24

Characteristic value configuration (component_2 = depositing)

| Char. value set | Characteristic value | Algorithm | APC parameter | Trigger on 1 | Trigger on 2 | Trigger on 3 | Trigger off 1 | Trigger off 2 | Trigger off 3 |
|---|---|---|---|---|---|---|---|---|---|
| Kennzahlenset 2 | GAS-STAB | Mean value | GAS | STEP | = | Stab | STEP | <> | Stab |
| Kennzahlenset 2 | GAS-STABS | Standard deviation | GAS | STEP | = | Stab | STEP | <> | Stab |
| Kennzahlenset 2 | GAS-MAIN | Mean value | GAS | STEP | = | Main | STEP | <> | Main |
| Kennzahlenset 2 | GAS-MAINS | Standard deviation | GAS | STEP | = | Main | STEP | <> | Main |
| Kennzahlenset 2 | GAS-COOL | Mean value | GAS | STEP | = | Cool | STEP | <> | Cool |
| Kennzahlenset 2 | GAS-COOLS | Standard deviation | GAS | STEP | = | Cool | STEP | <> | Cool |
| Kennzahlenset 2 | PRESSURE-MAIN | Mean value | PRESSURE | STEP | = | Main | STEP | <> | Main |
| Kennzahlenset 2 | PRESSURE-MAINS | Standard deviation | PRESSURE | STEP | = | Main | STEP | <> | Main |
| Kennzahlenset 2 | TIME-MAIN | Range | TIME | STEP | = | Main | STEP | <> | Main |
| Kennzahlenset 2 | TIME-RECIPE | Range | TIME | 0 | > | 0 | STEP | <= | 0 |

2400 — 10 characteristic values for characteristic value set_2 (no reduction)

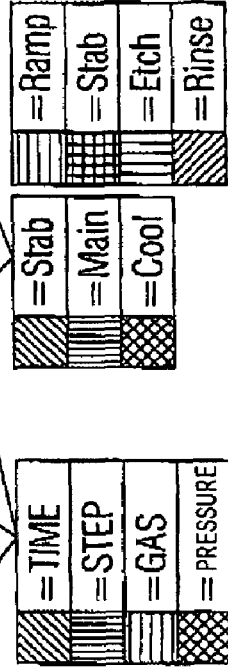

See parameter table:
- = TIME
- = STEP
- = GAS
- = PRESSURE

See recipe table:
- = Stab / = Ramp
- = Main / = Stab
- = Cool / = Etch
- = Rinse

ADVANCED PROCESS CONTROL METHOD AND ADVANCED PROCESS CONTROL SYSTEM FOR ACQUIRING PRODUCTION DATA IN A CHIP PRODUCTION INSTALLATION

BACKGROUND OF THE INVENTION

The invention relates to an Advanced Process Control method and an Advanced Process Control system for acquiring production data in a production installation, in particular in a chip production installation.

DESCRIPTION OF THE RELATED PRIOR ART

In the manufacture of LSI semiconductor chips, the ever-increasing miniaturization of the structures on the semiconductor chip are responsible in particular for imposing ever greater requirements on the production installations and manufacturing processes used for the manufacture of the semiconductor chips. The stability and reproducibility both of the production installations and of the manufacturing processes decisively influence the yield and productivity during semiconductor chip production. Even small deviations from a prescribed form of behavior of a chip production installation during production can lead to considerable worsening of the yield, that is to say to a considerable increase in the defect rate of the semiconductor chips manufactured.

Consequently, a major aspect in the manufacture of semiconductor chips is to detect possible deviations from a prescribed form of behavior in a chip production installation or during a manufacturing process at a very early time and to take corresponding countermeasures. Consequently, the analysis and monitoring of machines, in particular of the chip production installations, and of the manufacturing processes takes on very great commercial significance. Furthermore, the analysis and monitoring of many process steps of the manufacturing process is of considerable significance, since it is usually only rarely possible to repair an intermediate product after a process step has been carried out. A functional test of a manufactured semiconductor chip is generally not provided until right at the end of the manufacturing process, which leads to very late feedback into the manufacturing process of the results obtained.

It is further known to provide inline measurements of interim process results, for example of the layer thicknesses, the layer resistance and line widths, etc., by means of so-called Statistical Process Control (SPC). However, this leads to additional measuring steps in the overall manufacturing process and is consequently time-consuming and costly.

In so-called Advanced Process Control (APC), data from internal and external sensors of the production installations are analyzed in combination with measuring techniques used, including inline measured data on intermediate products, or else results of measurements on test structures, once the wafer has been completely processed, results of functional tests on the semiconductor chips, the yield of defect-free semiconductor chips, etc. In this way, both the stability of the production installations and the process stability can be increased significantly, and in this way so too can the production productivity and the product quality of the semiconductor chips manufactured.

In spite of these considerable advantages offered by the use of automated data acquisition and data analysis, that is to say the use for example of APC methods, so far APC methods have only been used very sporadically in semiconductor chip production. This is attributable in particular to the great variety of different production installations and different processes involved in the manufacture of semiconductor chips and the associated considerable number of raw data recorded in different data formats and also the considerable differences in the raw data on account of different production installations, sensors and software versions of the control program of the production installations which characterize the production installations or the manufacturing processes during chip production.

If individual monitoring by means of an individual specification limit were used for monitoring the data for at least some of the sensor parameters of a production installation or of a production process which are acquired and are to be monitored as part of automated data analysis, the number of parameters to be monitored and the monitoring algorithms to be set would be a multiple of the number of sensor parameters recorded, the number of production installations used in semiconductor chip production, the different products to be manufactured, that is to say the different semiconductor chips, and the production recipes used for manufacture, or even the individual recipe steps.

This shows the considerable number of parameters to be analyzed and to be monitored, which cannot be handled in practice.

In the case of such individual monitoring, it is also no longer possible to take into account influences of individual specification parameters on other parameters. Consequently, an analysis encompassing a number of machines is no longer possible, in other words a comparison of machines is no longer possible. In particular, correlations between parameters of the same process, correlations between parameters of different processes, for example a prior process and a subsequent process, cannot be determined.

Furthermore, it is known to calculate characteristic values for individual sensor variables determined by a respective sensor, that is to say respective raw data parameters. This usually takes place by means of one configuration per monitored machine covered by APC and per recipe or recipe step used as part of the manufacture of a semiconductor chip.

In the analysis of the characteristic values and the monitoring of the characteristic values with the specification limits assigned to the characteristic values, it is possibly also necessary to differentiate additionally according to the respective different products or types of product manufactured.

This means very high expenditure on configuration and care, i.e. maintenance expenditure, on the respective analysis, monitoring and control tools.

For this reason, APC methods have so far only been used very sporadically at individual positions as part of the manufacturing process of semiconductor chips and merely to a very restricted extent.

A systematic comparison between different machines used as part of a manufacturing process, between recipes or else between different products or product types, . . . , is scarcely possible or not possible at all in this way.

Furthermore, a standardized so-called SECS interface (Semiconductor equipment communication standard interface) is known.

In [1], a data bank system of a production installation for manufacturing electronic printed circuit boards is described. The data bank system provides a predetermined number of control tables, in which predetermined types of control parameter entries for controlling the manufacturing processes are stored. The data bank system has control mechanisms which carry out operation sequences in response to user instructions, whereby process steps are added, carried out or combined with other processes.

BRIEF SUMMARY OF THE INVENTION

The invention is based on the problem of acquiring production data in a production installation, in particular in a chip production installation, and providing them for analysis in a way which is simplified and less costly than in the prior art as part of an Advanced Process Control method and in an Advanced Process Control system.

The problem is solved by the Advanced Process Control method and the Advanced Process Control system for acquiring production data in a production installation, in particular in a chip production installation, with the features according to the independent patent claims.

In the case of an Advanced Process Control method for acquiring production data in a production installation with a number of production sub-installations, production sub-data are determined and stored by the production sub-installations. On the basis of at least one grouping table, the production sub-data are mapped onto compressed production sub-data with assignment of the production sub-data to groups of the grouping table. In the grouping table, machines of the production sub-installations are grouped into at least one machine group or machine components of the production sub-installations are grouped into at least one machine component group. Alternatively, manufacturing recipes, in particular chip manufacturing recipes, for the manufacture of a product or an intermediate product, are grouped into at least one recipe group or manufacturing parameters, in particular chip manufacturing parameters, in the manufacture of a product or an intermediate product are grouped into at least one parameter group. The analysis and monitoring of the production data takes place as part of an Advanced Process Control method by using the compressed production sub-data.

An Advanced Process Control system for acquiring production data in a production installation has a number of production sub-installations, the production sub-installations generating or being capable of generating production sub-data. Furthermore, at least one memory is provided for storing the production sub-data generated and also an evaluation computer, which is coupled to the memory and is set up in such a way that the production sub-data can be mapped onto compressed production sub-data on the basis of at least one grouping table, with assignment of the production sub-data to groups of the grouping table. In the grouping table,

- machines of the production sub-installation are grouped into at least one machine group or
- machine components of the production sub-installations are grouped into at least one machine component group, or
- manufacturing recipes, in particular chip manufacturing recipes, for manufacturing a product or an intermediate product are grouped into at least one manufacturing recipe group, or
- manufacturing parameters, in particular chip manufacturing parameters, in the manufacture of a product or an intermediate product are grouped into at least one manufacturing parameter group.

Also provided is an analysis and monitoring device, with which the production data can be analyzed and monitored as part of the Advanced Process Control, using the compressed production sub-data.

A production installation is to be understood in this connection as meaning a system or an arrangement in which a product or an intermediate product is manufactured by using different raw materials. It should be noted in this connection that the invention can be used all the more efficiently the more complexly the manufacturing process is set up, if at least some machines, processes, recipes or parameters are used which are similar to one another but cannot readily be registered by data acquisition and processed together in one data acquisition on account of slightly different nomenclatures used or a different structure or different software version of the control program respectively used.

The invention can be advantageously used in particular in semiconductor production, i.e. for example in the manufacture of monocrystalline or polycrystalline silicon or some other semiconductor material, or else semiconductor chip production, i.e. in the manufacture of semiconductor chips in a chip production installation, since the criteria stated above are satisfied very well in the case of such processes in particular. However, it should be pointed out in this connection that the invention can be advantageously used in any production process, in particular if many process steps are necessary and information on the process sequence can be automatically made available by the production installations.

A chip production installation is to be understood in this connection as meaning a system or an arrangement in which semiconductor components, in particular semiconductor chips, are produced by using different raw materials, for example by using semiconductor materials such as silicon or else other main group IV semiconductor materials (for example germanium) or binary, ternary or else quaternary III-V compound semiconductor materials (for example indium-gallium-arsenide-phosphide, indium-gallium-arsenide-antimonide, etc.), or binary, ternary or else quaternary II-VI compound semiconductor materials.

A semiconductor chip is to be understood in this description as meaning for example a memory chip, a microprocessor chip, a communication chip, a chip with an integrated semiconductor laser element, and also a chip optimized to a hardware function which can be predetermined as desired, such as for example a communication chip for the decoding of received radio signals or a chip for the processing of video signals.

The chip production installation has, according to the invention, a number of production sub-installations, for example different machines, with which the physical or chemical process steps necessary for the overall manufacturing process of a chip can be carried out.

An example in particular in the front-end area of chip production is that of devices for carrying out the following process steps:

- a Rapid Thermal Processing Device (RTP device),
- a furnace for heating up the wafers to be processed,
- an etching device, for example a plasma-etching device, or a dry-etching device,
- a lithographic device,
- a wet-treatment device for etching, resist removal, cleaning or altering the product surface,
- a CMP device, i.e. a device for carrying out chemical-mechanical polishing,
- an ion-implantation device,
- a depositing device for depositing layers on the wafer, for example a depositing device for Physical Vapor Deposition (PVD) or Chemical Vapor Deposition (CVD),
- a measuring device for measuring predetermined wafer parameters or process parameters,
- a testing device for testing wafers manufactured.

Depending on the product respectively to be manufactured, for example depending on the desired configuration of the chip to be produced, a multiplicity of different devices, that is to say production sub-installations, are provided in the chip production installation and coupled to one another to realize the respective necessary overall semiconductor chip production process.

It should be noted in this connection that the sequence of individual process steps in the respective production sub-installations can either be carried out "sequentially", i.e. always first in a first installation group A (for example resist coating) before a second installation group B (for example exposure) for two manufacturing steps which are to take place one after the other, or can be carried out "in parallel", i.e. in a first installation B1 (for example Scanner type XY100) or a second installation B2 (for example Stepper type Extra2000) for two different installations and processes which can alternatively carry out one and the same manufacturing step.

The machines can be grouped according to their respective properties into machine groups with machines with regard to a similarity criterion of adequately similar properties. This graphically corresponds to the parallel sequence of the respective process steps in different machines.

Machines in the area of chemical vapor deposition, and also all other respective machines, can be divided into different machine types. For example, any CVD machine usually, but not necessarily, has a so-called mainframe, that is to say a robot or robot arm, and a robot controller, assigned to the robot or robot arm, for distributing and controlling the respective wafers to the individual process chambers of the CVD machine, and also at least one process chamber for processing the respective wafers according to the method set in the process chamber. In the case where no mainframe is provided, it is merely the case that the individual process chambers are process-area-specific.

Such a CVD machine may consequently be one of a varying machine type, for example a CVD machine may be differentiated between machines with:

a mainframe and four process chambers,
a mainframe and two process chambers, and
only one process chamber and no mainframe.

Generally, however, depending on requirements, in principle any desired number of process chambers or other machine components may respectively form a machine type of a machine, in particular a CVD machine.

A machine consequently has different machine components, for example the mainframe or a process chamber. A process chamber is to be understood for example as meaning a depositing chamber, in which appropriate materials or layers are deposited on the wafer to be processed by using gases supplied to the depositing chamber. A process chamber is also to be understood as meaning an etching chamber, in which a wafer supplied to the etching chamber is structured, that is to say etched, by using a gas or plasma, likewise supplied to the etching chamber, or a liquid supplied. A process chamber may also be set up in such a way that in it material grows epitaxially on the respective surface of the wafer to be processed.

The individual machine components may in turn be of varying types, which are referred to hereafter as the respective machine component type.

The machine component types usually depend on the manufacturer of the machine component which provides a respective machine component.

Production sub-data are determined from each production sub-installation, usually by using the sensors assigned to the respective machines or machine components, and stored as production sub-data in one or more electronic files. For instance, the production sub-data can be uniquely stored in files respectively assigned to a machine or machine component, in particular by using the SECS standards (Semiconductor equipment communication standard).

The stored production sub-data are then mapped onto compressed production sub-data by using the grouping table, the grouping of the respective machines, machine components, manufacturing processes or chip manufacturing parameters taking place with account taken of the respective properties and the similarity of the respective properties to other machines, machine components, chip manufacturing recipes or chip manufacturing parameters.

By utilizing the respective similarities of the individual elements with respect to one another, a considerable reduction in the production sub-data to be taken into account is achieved, thereby achieving for the first time an amount of data to be taken into account which can be analyzed, monitored, and consequently also controlled, by customary personal computers, that is to say by customary monitoring tools, analysis tools and control tools. Furthermore, according to the invention, an intelligent grouping of the individual elements is provided, which improves the statistics and ensures comparability of the production sub-data to be taken into account.

This for the first time permits a practicable and low-cost, comprehensive and area-subsuming possibility for automated data analysis and process monitoring and control, that is to say for Advanced Process Control (APC) as part of semiconductor chip production.

Preferred developments of the invention emerge from the dependent claims. The further refinements of the invention concern both the method and the system for acquiring production data in a chip production installation.

According to one refinement of the invention, the production sub-data are transmitted from the production sub-installations to a central memory and stored there in at least one central file, with preferably a number of files being provided for storing the production sub-data, which are stored in directories which are respectively assigned to a machine or process chamber, of generally one production sub-installation.

In this way, a centralized and consequently easy-to-monitor, easily configurable and consequently inexpensively maintainable possibility for semiconductor production process monitoring is created.

Furthermore, the machines which respectively have adequately similar machine properties with regard to a machine similarity criterion can be grouped into machine groups.

Furthermore, the machine components which respectively have adequately similar machine component properties with regard to a machine component similarity criterion can be grouped into machine component groups.

Furthermore, those semiconductor manufacturing recipes which respectively have adequately similar recipes with regard to a semiconductor chip manufacturing recipe similarity criterion can be grouped into recipe groups.

Furthermore, those chip manufacturing parameters which have adequately similar chip manufacturing parameters with regard to a chip manufacturing parameter similarity criterion can be grouped into parameter groups.

The groupings can take place alternatively or commonly in different grouping tables or in a common grouping table. The more areas in which the grouping is provided, the greater the achievable degree of compression of the amount of data to be taken into account.

The form taken by the similarity criteria is dependent on the respective device or on the respective parameters or recipes which are used in the (chip) production installation.

In other words, this means that both the definition of the similarity criteria and the grouping of the respective components into groups can be greatly varied and are very process-dependent, product-dependent and also machine-dependent or machine-component-dependent.

Furthermore, according to a further refinement of the invention, the compressed production sub-data can be subjected to a subsequent, preferably statistical, data analysis, whereby a further improved and more exact monitoring of the overall manufacturing process and the production installations involved in the manufacturing process is achieved.

The invention can be seen graphically in the provision of a procedure as part of APC for the analysis and monitoring of installation data and process data in which different machines and processes can be registered together by data acquisition. With the aid of just a few grouping tables, which are formed in an optimized manner and may also be referred to as allocation tables or mapping tables, it is possible according to the invention for differences between individual machines, machine groups, recipes or recipe parameters that are irrelevant for the monitoring per se to be respectively balanced out step-by-step within a corresponding hierarchy of order and to combine similar elements. A similar configuration as part of APC consequently no longer takes place per machine, machine component, recipe or recipe step, as usual according to the prior art, but only per machine group, machine component group, recipe group or recipe parameter group.

This also has in particular the considerable advantage of just a small remaining expenditure on configuration and maintenance of the monitoring device and the monitoring programs used.

Consequently, the raw data material are used in a very effective way to generate common characteristic values, which have a very high information content concerning the properties and behavior of the respective machines and all the production processes. Furthermore, according to the invention, consequently a long-term comparison of the data of a small subgroup of production sub-installations with the data of the totality of the group of the production sub-installations is also possible, which permits quasi-continuous monitoring, in spite of discontinuous data of the respective subgroup of the production sub-installations.

It has consequently become possible for the first time to use automated process monitoring, that is to say APC, comprehensively and profitably in semiconductor chip production. Even within a relatively large group of production installations which are not necessarily of the same construction, with a multiplicity of production processes used, it is possible for relevant information, such as differences even between machines/machine components of a machine group, offsets, drifts, trends, outliers, etc. to be detected and analyzed.

To sum up, the invention can consequently also be seen in the fact that the signal variation over time of a sensor can be represented such that it is compressed into characteristic values which characterize the respective signal variation and the machine or the process.

The configuration of these characteristic values takes place for a large number of different installations and processes together, with the aid of allocation tables organized in an optimized, preferably hierarchical, manner, the grouping tables.

Even though the invention is explained in more detail below on the basis of the example of a chip production installation, it must be pointed out that the invention is not restricted to this but can be used in all production installations with production sub-installations, for example also in the pharmaceuticals industry in the manufacture of pharmaceutical products.

BRIEF DESCRIPTION OF THE DRAWINGS

An exemplary embodiment of the invention is explained in more detail below and represented in the figures, in which:

FIG. 6 shows a detail of a file according to the PDSF format, in which the logistical information is stored;

FIG. 7 shows a further file according to the PDSF format, in which the sensor parameters per unit of time are stored;

FIGS. 9a to 9c show diagrams of three different machine types of CVD machines which are grouped into machine groups according to an exemplary embodiment of the invention, a first machine type having a mainframe and four process chambers (FIG. 9a), a second machine type having a mainframe and two process chambers (FIG. 9b) and a third machine type having one process chamber (FIG. 9c), it being possible for the machines of the machine types grouped into one machine group to be configured and retrieved together;

FIG. 10 shows a block diagram in which different grouping possibilities are outlined;

FIG. 11 shows a representation of a grouping table in which a number of machines are grouped into component types;

FIGS. 12a to 12g show block diagrams in which the raw data recording for the individual machines, that is to say production sub-installations, according to the exemplary embodiment is represented;

FIG. 13 shows a table in which the assignment of the parameter sets as part of the raw data recording is represented;

FIG. 14 shows a table in which the parameter configuration for machines of one machine type with different mainframes is represented;

FIG. 15 shows a table in which the parameter configuration for all the depositing process chambers represented in this exemplary embodiment is represented;

FIG. 16 shows a table in which the parameter configuration for all the back-etching process chambers represented in this exemplary embodiment is represented;

FIG. 18 shows a table in which individual recipes are assigned to recipe groups, also referred to as recipe sets;

FIG. 19 shows a table in which the recipe configurations of the depositing process chambers of the machine group are represented;

FIG. 20 shows a table in which the recipe configurations of the back-etching process chambers of the machine group are represented;

FIG. 21 shows a table in which individual machines, component types, parameter sets and recipe sets are assigned to different characteristic value sets;

FIG. 22 shows a grouping table in which the characteristic value configuration for a mainframe, according to this exemplary embodiment for the mainframe Centura and P5000, is represented;

FIG. 23 shows a table in which the characteristic value configuration for the depositing process chambers is represented and FIG. 24 shows a table in which the characteristic value configuration for the back-etching process chambers is represented.

DETAILED DESCRIPTION OF THE INVENTION

Hereafter, identical designations are used in the figures for the same elements.

Figure 1:
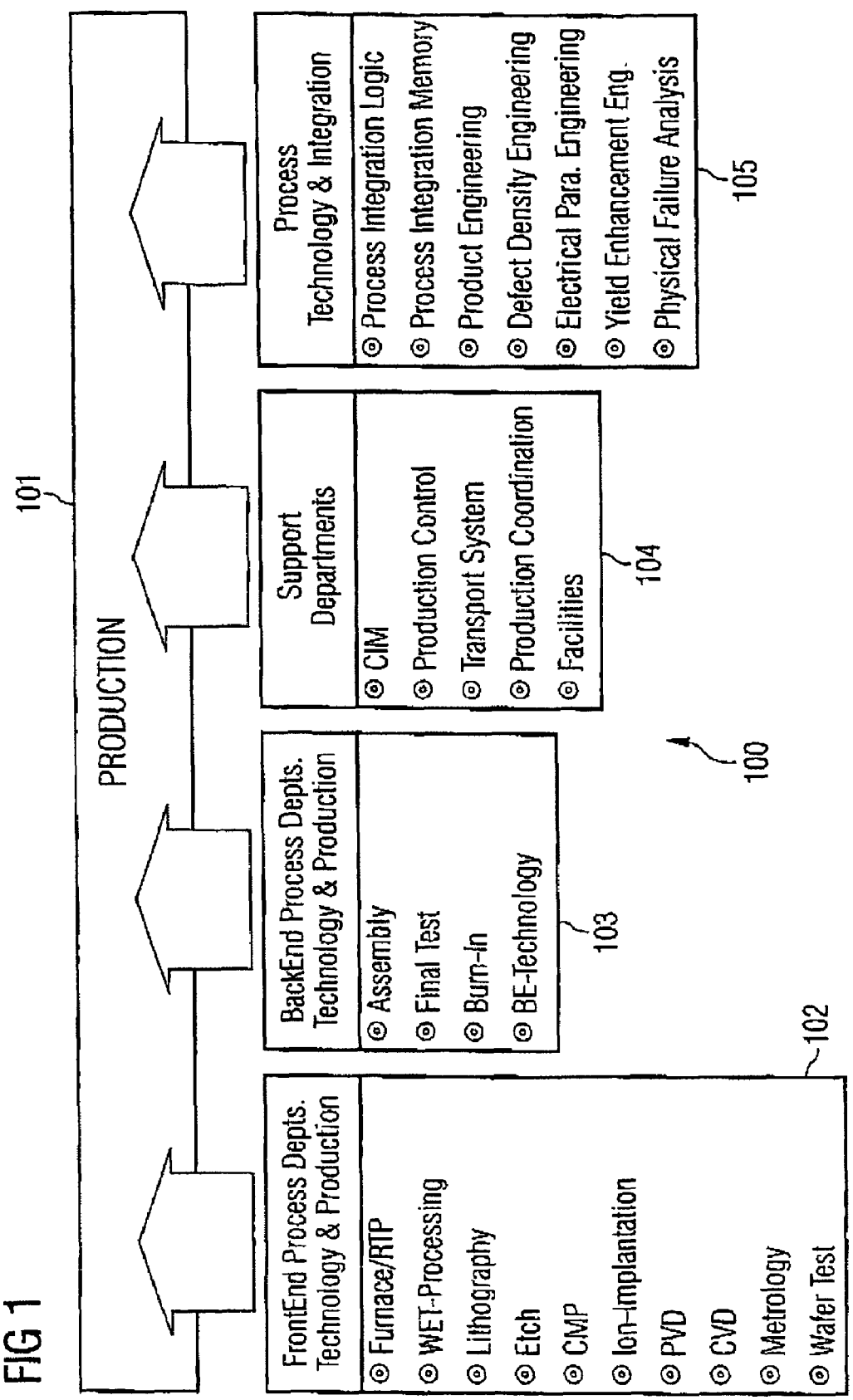
FIG. 1 shows a block diagram in which the general organization of a chip production installation is represented.

FIG. 1 shows in a block diagram 100 the organization and setup of a semiconductor production installation according to an exemplary embodiment of the invention.

The overall manufacturing process, referred to in FIG. 1 by a first block 101, is grouped according to this exemplary embodiment into four production areas 102, 103, 104, 105,
- a first area, into which the front-end processes of the chip production are grouped (block 102),
- a second area of the manufacturing process, into which the back-end processes are grouped (block 103),
- a third area of the manufacturing process, which relates to the support, that is to say the backup, of the individual manufacturing processes (block 104),
- a fourth area, which relates to the process technology and the process integration (block 105).

In the case of the front-end processes 102, the following process technologies and the devices set up for carrying out the corresponding processes are provided in particular:
- a furnace for heating up the respective wafer to be processed,
- a device for carrying out Rapid Thermal Processing (RTP),
- a device for etching the wafer, for example for wet-etching or for dry-etching,
- a device for cleaning, for example washing, the wafer,
- a device for carrying out various lithographic steps,
- a device for chemical-mechanical polishing (CMP),
- a device for carrying out an ion-implantation in predetermined areas of the wafer or of the chip respectively to be produced,
- devices for applying materials to the wafer, for example devices for depositing materials from the vapor phase, that is for example devices for carrying out Physical Vapor Deposition (PVD) or Chemical Vapor Deposition (CVD), or a device for epitaxially growing material on a substrate,
- metrology devices, i.e. measuring devices,
- devices for carrying out tests on the respective wafers.

The back-end processes relate in particular to the following areas:
- the assembly of the chips in packages,
- the final test of the finished and packaged chip,
- the introduction of information, for example product information, into or onto the package of the respective chip, and also
- generally the technologies used in the back-end area for packaged and unpackaged chips.

The support, that is to say the process backup, relates in particular to the following areas:
- CIM,
- process monitoring,
- a transportation system for delivering the finished semiconductor chips,
- coordination of production,
- backup for the respective production sites.

Process technology and process integration relates in particular to
- the process integration of logic chips,
- the process integration of memory chips,
- product engineering,
- the monitoring and improving of defect densities in manufacture,
- the monitoring of electrical parameters in the products manufactured,
- enhancement of the yield of the chips manufactured,
- a physical failure analysis.

Figure 2:
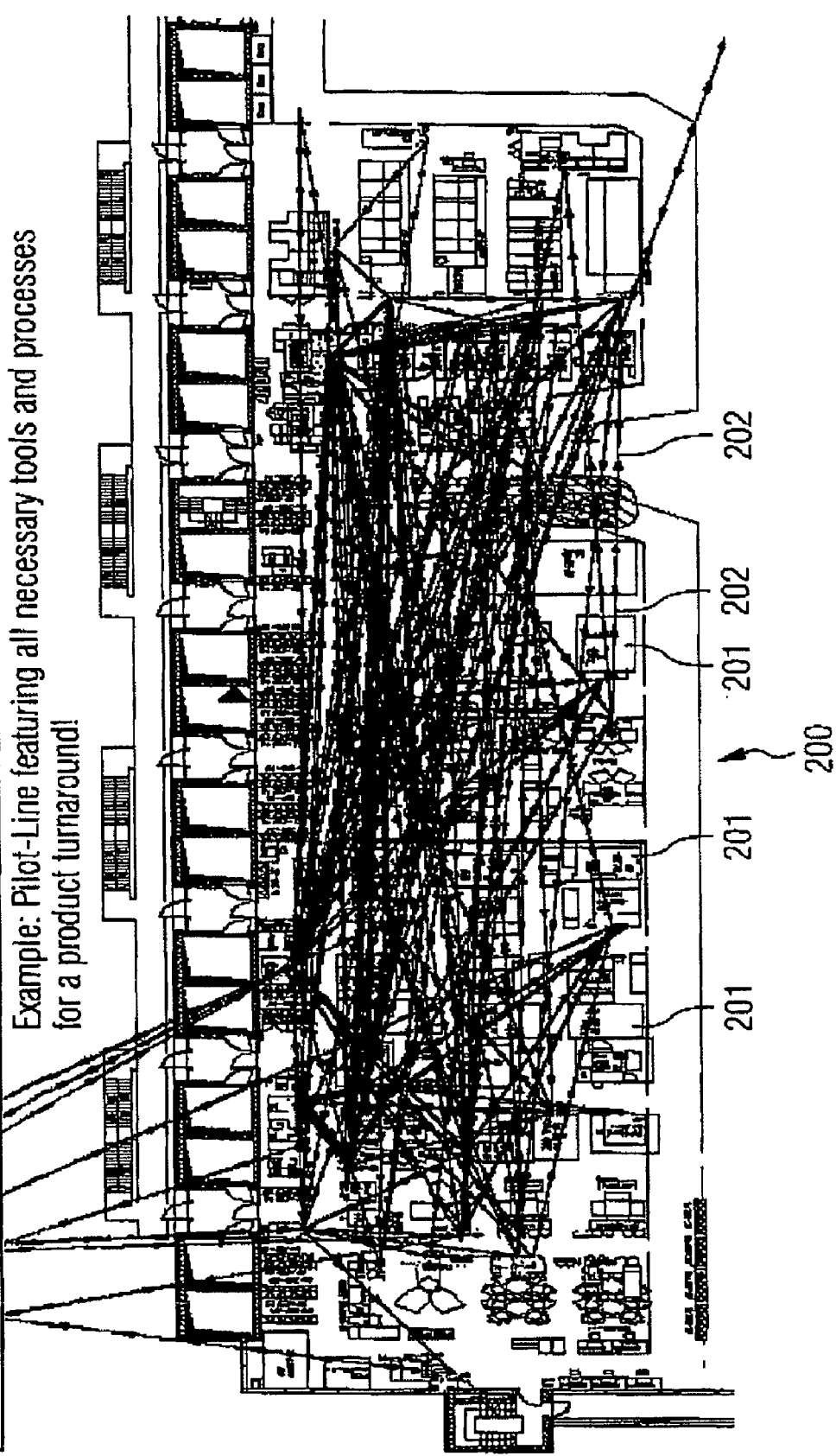
FIG. 2 shows a diagram of a chip production installation according to an exemplary embodiment of the invention, the complex material flow, i.e. the path of a wafer/lot, through the chip production installation being represented.

FIG. 2 shows a semiconductor chip production installation, in other words a semiconductor chip factory 200, according to an exemplary embodiment of the invention with a multiplicity of semiconductor chip production sub-installations 201, which are used for processing raw materials, for example a silicon wafer or a wafer made of other semiconductor materials (germanium, gallium-arsenide, indium-phosphide, etc.), in order to produce semiconductor chips from the raw materials.

A customary manufacturing process for manufacturing a semiconductor chip has hundreds of different process steps, in which lithographic steps, etching steps, CMP steps, steps for applying materials to the respective wafer to be processed, or else steps for doping or implanting doping atoms in the wafer to be processed are carried out in various sequences.

This results in the path of a wafer or a lot through the semiconductor chip production installation 200, as represented in FIG. 2 by lines 202. In the semiconductor chip production installation 200 there are a multiplicity of sensors, which are assigned to the respective production sub-installations 201, and an even greater amount of raw data, which are respectively acquired by the sensors and, as explained in more detail below, are processed. A respective sensor may be integrated into a respective machine (integrated sensor) or be attached separately to a respective machine (external sensor).

Hereafter, the production sub-installations 201 are also referred to as machines 201.

Figure 3:
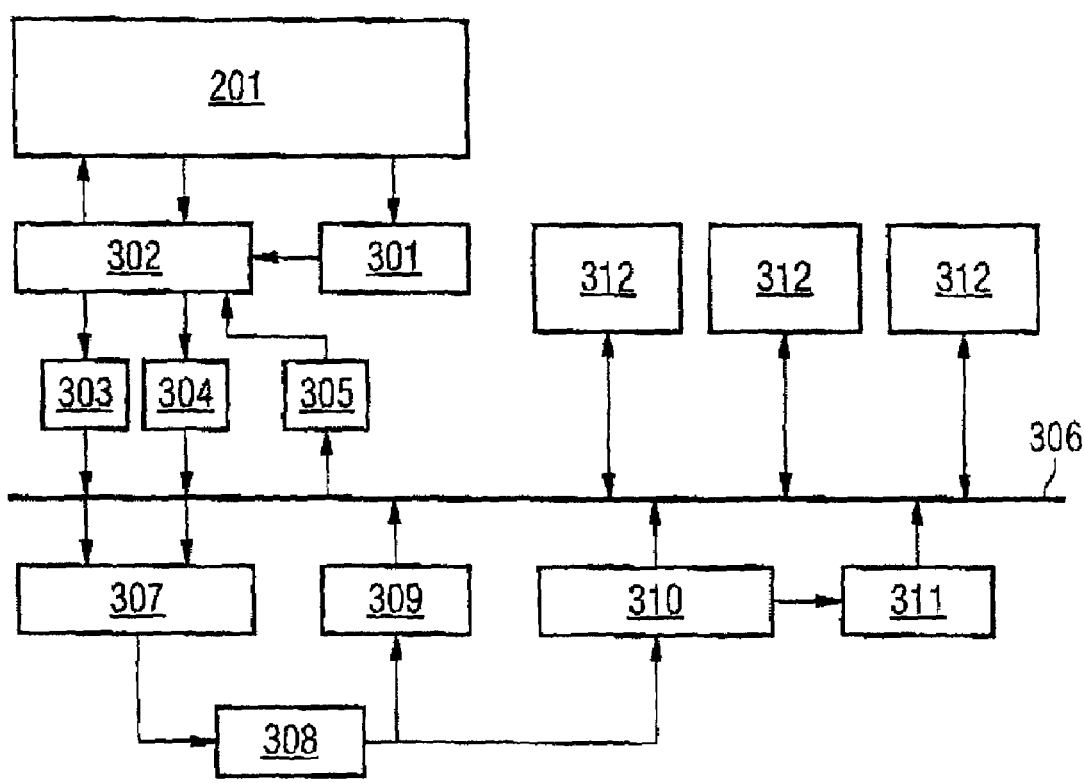
FIG. 3 shows a block diagram in which the data flow according to the exemplary embodiment of the invention is represented.

FIG. 3 shows by way of example the data flow for data which are acquired on a machine 201 by means of an integrated sensor or by means of an external sensor 301. Each sensor 301, it being possible for any desired number of integrated and/or external sensors to be provided, acquires the parameters of the machine 201 which are respectively predetermined for it, for example physical or chemical states in a process chamber, the position of a robot arm, etc.

The sensor 301 is coupled via an SECS interface 302, which is set up for data communication according to the SECS standards, to a local communication network (Local Area Network, LAN) 306.

According to the SECS standards, files are generated by the sensor 301 and the SECS interface 302 according to the PDSF format (Process Data Standard Format), also referred to hereafter as PDSF files 303 and also log files 304, the PDSF files 303 and the log files 304 being stored as raw data in a memory 307, according to this exemplary embodiment for a limited time period of preferably 6 months.

According to this exemplary embodiment, the PDSF files 303 contain analog data from up to 70 channels, that is to say from up to 70 different internal (i.e. integrated) and/or external sensors 301, which may be attached to a machine 201. According to this exemplary embodiment, approximately 150 MB of data are generated per month and machine 201 and stored in the memory 307.

In the log files 304, various data are stored machine-specifically, for example a time indication, indications of events concerning events which have occurred in the machine 201, alarms, logistical data. According to this exemplary embodiment, approximately 1 MB of data per month and machine is stored in a log file 304 in the memory 307.

As explained in more detail below, the raw data stored in the memory 307 are grouped, that is to say filtered and fed to different algorithms, as symbolized in FIG. 3 by means of a block 308 and, when a predetermined alarm or message criterion is satisfied, an alarm or a message is generated and transmitted via an alarm/message sending unit 309 via the local communication network 306 and the SECS interface 302 to the machine 201, which is similarly directly coupled to the SECS interface 302, or to client computers 312 explained below.

Furthermore, characteristic process values are generated from the raw data by means of the filter algorithms and stored in an Oracle™ data bank 310, as will be explained in still more detail below. According to this exemplary embodiment, approximately 6 MB of data per month and machine are stored as characteristic value data in the data bank 310.

By using the characteristic values with various software tools, symbolized in FIG. 3 by a block 311, statistical analyses are carried out, graphics generated, reports prepared or else a model of the production process provided for further simulation of the production process.

The corresponding data are in turn provided via the local communications network 306 to a multiplicity of client computers 312 of users, for example of machine engineers, process engineers or product engineers, so that, by using the analysis data, said users can perform corresponding measures for optimizing the semiconductor production process.

According to this exemplary embodiment, machines 201 from the area of front-end processing are described below, but it should be noted that the invention is not restricted in any way to the area of front-end processes, but in particular relates to all areas of semiconductor chip production.

As explained above, the semiconductor chip production installation 200 in the area of front-end processes according to this exemplary embodiment is grouped into a number of process areas, in particular into:
  Physical Vapor Deposition (PVD),
  Chemical Vapor Deposition (CVD),
  epitaxy,
  lithographic methods,
  etching methods, in particular plasma-etching methods, dry-etching methods, wet-etching methods, etc.

According to the invention, within the process areas of the front-end processes, the grouping of the machines 201 respectively used is carried out in such a way that all the machines 201 which are intended to be able to be configured or retrieved together are assigned to one machine group.

For example, the process area of chemical vapor deposition is subdivided into four different machine groups, which provides different processes in a CVD method, that is to say into:
  a first machine group for the depositing of TEOS,
  a second machine group for the depositing of silane_1,
  a third machine group for the depositing of silane_2,
  a fourth machine group for the depositing and back-etching of tungsten (in particular installations from the manufacturer Applied Materials™).

According to this exemplary embodiment, in spite of the same area of use, the second and third machine groups differ so much with respect to the logged and stored process parameters and the processes respectively used that it would not be advisable for the machines to be able to be configured and retrieved together in an identical machine group.

The example represented above shows that the grouping of the respective machines 201 used is strongly dependent on the machines 201 themselves and the respective area of use in the corresponding manufacturing process.

Figure 4:
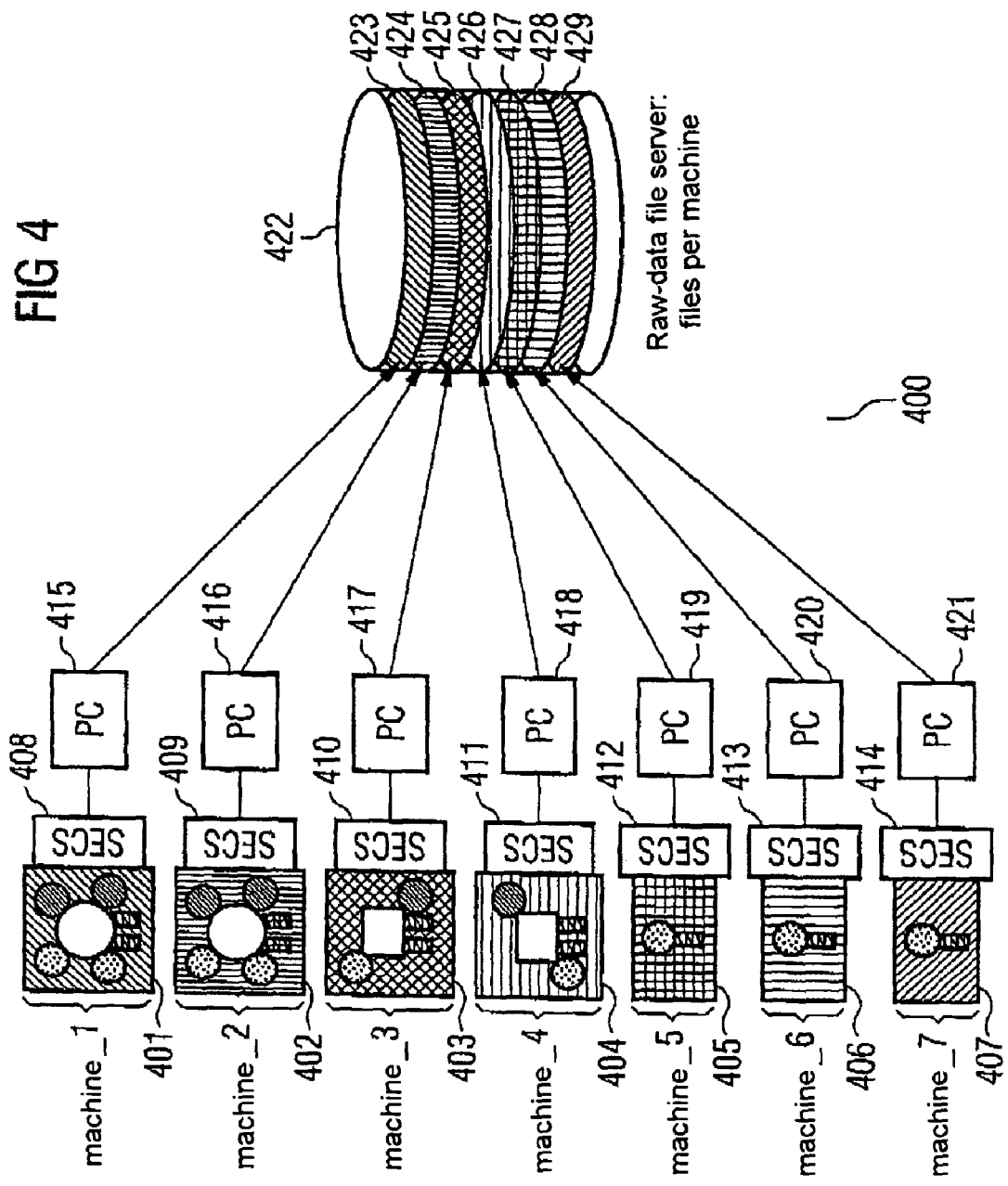
FIG. 4 shows a block diagram in which the acquiring, transferring and storing of raw data acquired by the sensors is represented.

FIG. 4 shows the raw data recording in a block diagram 400 with seven machines 401, 402, 403, 404, 405, 406, 407, which are coupled via a respectively assigned SECS interface 408, 409, 410, 411, 412, 413, 414 to a respective personal computer 415, 416, 417, 418, 419, 420, 421. Via the respective SECS interface 408, 409, 410, 411, 412, 413, 414, the machine 401, 402, 403, 404, 405, 406, 407 or the integrated and/or external sensor or sensors which are assigned to the machine 401, 402, 403, 404, 405, 406, 407 transmit(s) determined raw data to the respective personal computer 415, 416, 417, 418, 419, 420, 421, which personal computers 415, 416, 417, 418, 419, 420, 421 transfer data received to a raw-data file server 422. In the raw-data file server 422, the raw data transmitted from the personal computer 415, 416, 417, 418, 419, 420, 421 are stored in respectively a plurality of electronic files 423, 424, 425, 426, 427, 428, 429, which are respectively stored in a respective directory, which is respectively uniquely assigned to a machine or machine component 401, 402, 403, 404, 405, 406, 407.

In other words, this means that in the raw-data file server 422 only the raw data of precisely one machine or machine component 401, 402, 403, 404, 405, 406, 407 are respectively stored in a directory 423, 424, 425, 426, 427, 428, 429, so that a unique assignment of files stored in the raw-data file server 422 in the directories 423, 424, 425, 426, 427, 428, 429 to the machines 401, 402, 403, 404, 405, 406, 407 generating files, respectively stored in the directories (files) 423, 424, 425, 426, 427, 428, 429, is possible.

In this connection it should be noted that, according to alternative refinements of the invention, a 1:1 assignment of the SECS interface 408, 409, 410, 411, 412, 413, 414 to a personal computer 415, 416, 417, 418, 419, 420, 421 is also not absolutely necessary, but instead there may also be generally a number of personal computers provided for an SECS interface or one personal computer for a number of SECS interfaces.

Figure 5:
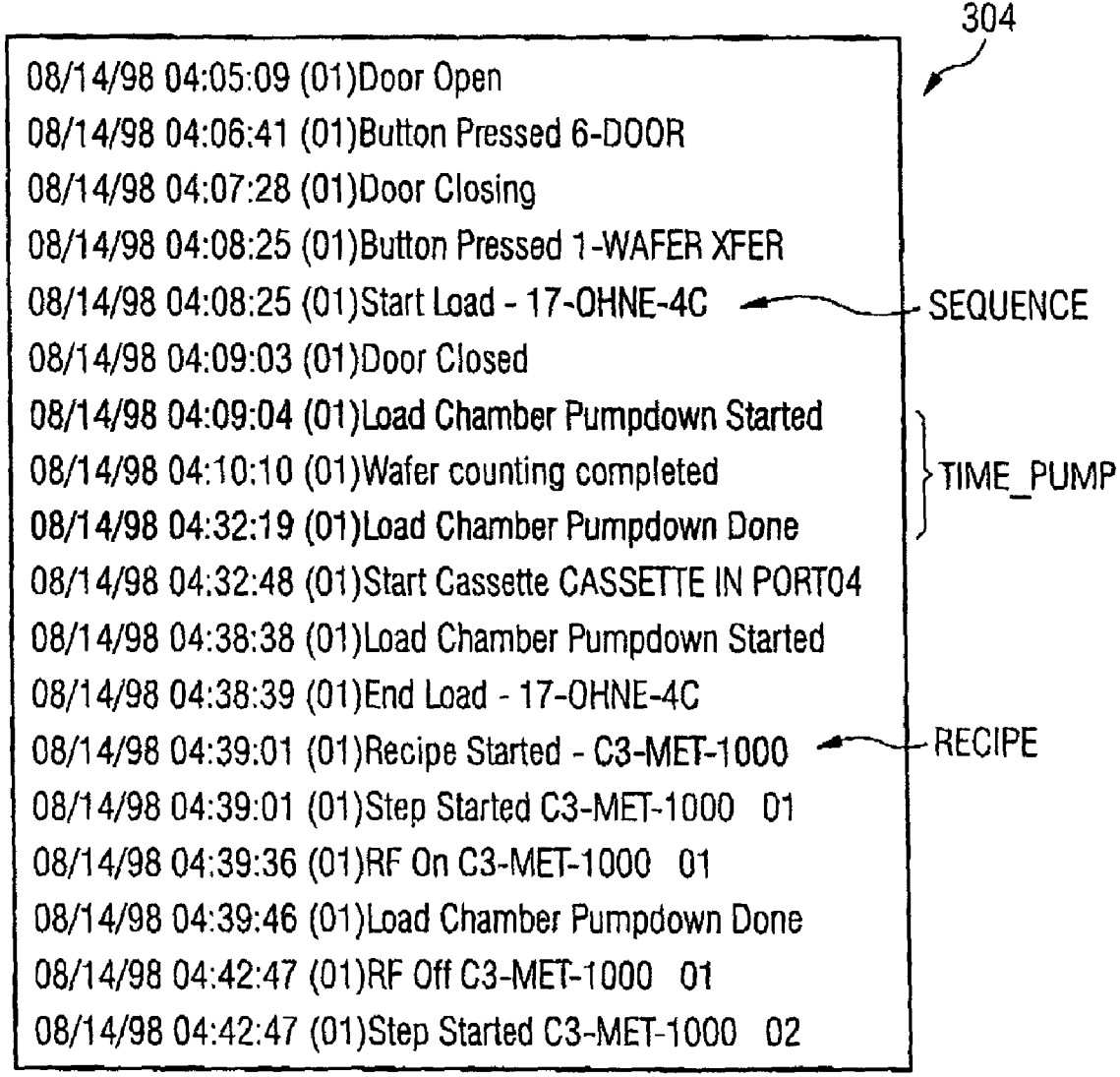
FIG. 5 shows an extract from a log file of a machine with raw data, which log file has been generated by a sensor.

FIG. 5 graphically shows a detail from a log file 304, which is respectively generated by the machine and the SECS interface 302 and the extraction of characteristic values from the corresponding log file 304.

For example, as shown in FIG. 5, the temporal beginning of a process sequence of a machine is determined from the indication "Start Load-17-ohne-4c", that is to say, according to the log file 304, 14.08.1998 at 04:08:25.

The time in which a pump in a process chamber is activated is determined from two events from the log file 304, according to this exemplary embodiment generated from the event "Load Chamber Pumpdown Started", which has begun at a first point in time, that is to say 04:09:04 on 14.08.1998, and the event "Load Chamber Pumpdown Done", logged on 14.08.1998 at 04:32:19, by forming the difference between the two points in time logged.

A further characteristic value, which according to this exemplary embodiment is extracted from the log file 304, is the indication of a recipe, according to this exemplary embodiment the recipe with the designation "C3-MET-1000".

Represented in FIG. 6 and FIG. 7 is an example of a detail of a PDSF file 303, in which
   in a first column 601 there is an index indication,
   in a second column 602 there is a recipe indication,
   in a third column 603 there is an indication of the cassette in which the respective wafer to which the logged indication refers is located,
   in a fourth column 604 there is an indication of the slot in which the respective designated wafer is located,
   in a fifth column 605 there is a lot indication, indicated in which is the lot in which the wafer to which the respective indication refers is contained,
   in a sixth column 606 there is an indication of the respective method step which is being carried out at this point in time, and
   in the detail of the PDSF file in FIG. 7, in a time column 701 there is a time indication, via further columns 702 and 703 there are respectively interlinking indications for indexing the respective row of the detail from the PDSF file 303 according to FIG. 6, and in further columns 704, 705, 706, 707 there is the indication of a respective process step (Step A, Step B) and also the indication of pressure prevailing in the respective process chamber in the respective step (Pressure_A, Pressure_B).

Typically, approximately 50 different parameters are recorded per machine. Apart from the parameters, as presented above, lot information is also logged, together with logistical information.

For instance, each data point, that is to say each row in a log file 304 or in a PDSF file 303, can be uniquely assigned in time to a lot and corresponding logistical information, such as for example the recipe respectively used, the respective technology or the operation respectively carried out in a process chamber.

Physically identical parameters often have different names or, on account of different sensors or versions of machines or sensors, identical parameters are often recorded in different physical units; for example, a first machine records the pressure in the unit Torr, but a second machine records the pressure in the unit mTorr.

Figure 8:
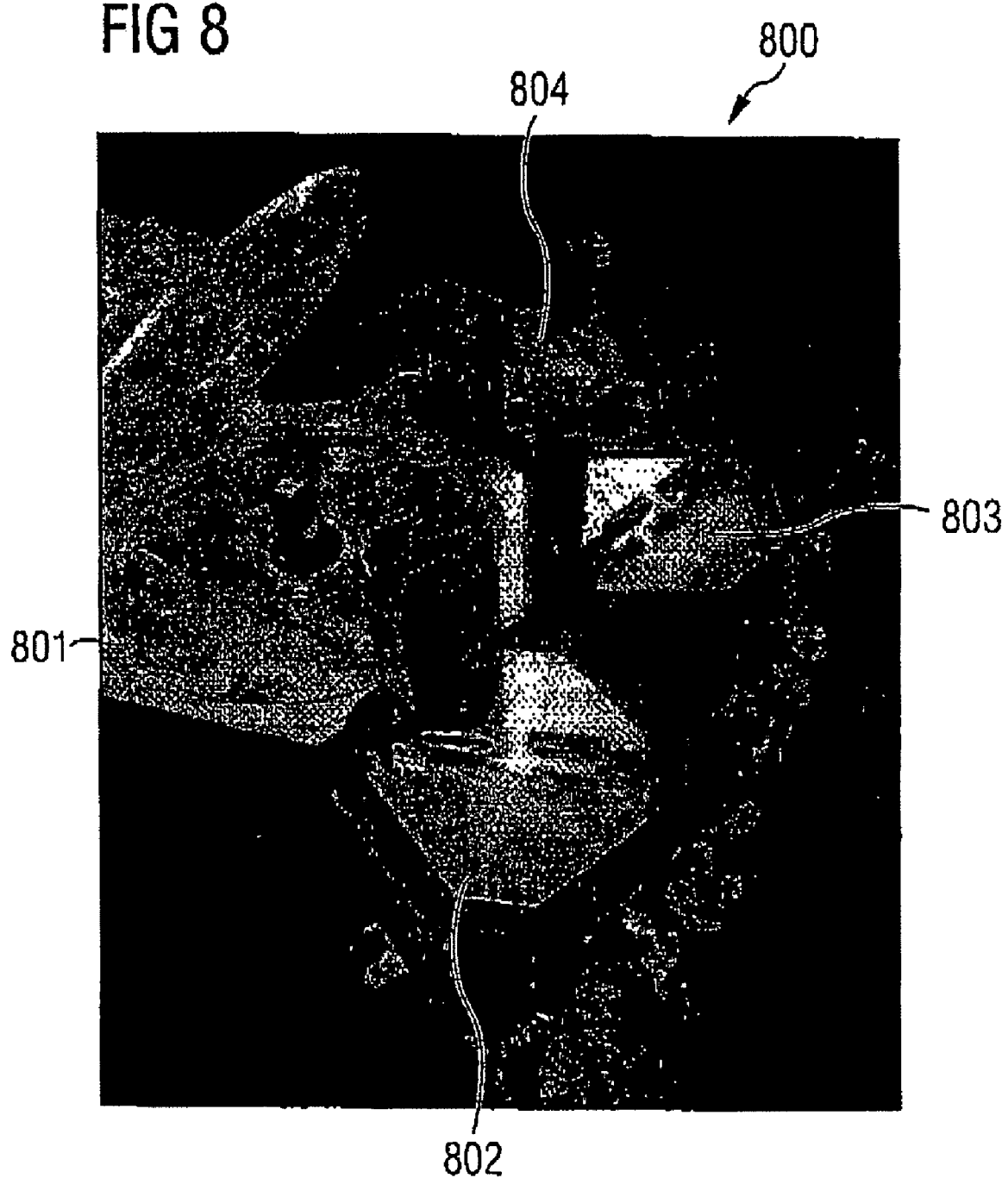
FIG. 8 shows a representation of a machine with a mainframe and four process chambers.

FIG. 8 shows by way of example the representation of a machine 800 with a mainframe 801 and four process chambers 802, 803, 804, 805, which may be designed in the same way or in a different way for carrying out the same or different processes and recipes.

With reference to FIG. 4 and FIG. 9a to FIG. 9c, the machines 401, 402, 403, 404, 405, 406, 407 provided according to this exemplary embodiment are machines of three different types, a first machine type represented in FIG. 9a, a second machine type represented in FIG. 9b, and a third machine type represented in FIG. 9c.

According to the invention, the first machine 401 and the second machine 402 are grouped into a second machine group, according to this exemplary embodiment of a first machine type, as represented in FIG. 9b.

The machines 401, 402 of the first machine type are a multi-chamber installation from the company Applied Materials™ of the type Centura™ with four process chambers, a Centura™ mainframe and also in each case two loading stations for feeding and discharging wafers to the machine and away from the machine.

According to this exemplary embodiment, the first machine 401 has the following machine components, which are respectively grouped into component types on the basis of an identical or similar configuration:
   a first loading station 901 as a first loading component designated by A,
   a second loading station 902 as a second loading component designated by B,
   a Centura™ mainframe 903 as a mainframe component designated by MF (component$_{-1}$),
   a first process chamber A 904, set up as a depositing process chamber, hereafter referred to as component_3,
   a second process chamber B 905, likewise set up as a depositing process chamber, hereafter referred to as component_3,
   a third process chamber C 906, set up as a back-etching process chamber, hereafter referred to as component_4,
   a fourth process chamber D 907, set up as a back-etching process chamber, hereafter also referred to as component_4.

The second machine 402 has as components the following machine components, which are likewise respectively grouped into component types on the basis of an identical or similar configuration:
   a first loading station 911 of the first component type A,
   a second loading station 912 of the second component type B,
   a Centura™ mainframe MF 913 as component_1,
   a first process chamber A 914, set up as a depositing process chamber (component_3),
   a second process chamber B 915, likewise set up as a depositing process chamber (machine component_3),
   a third process chamber C 916, set up as a back-etching process chamber (machine component_4),
   a fourth process chamber D 917, likewise set up as a back-etching process chamber (machine component_4).

Consequently, on account of their very similar configuration and on account of the same existing machine components of the same machine component type, the first machine 401 and the second machine 402 are grouped into the first machine type, that is to say a machine type with a multi-chamber installation with two loading stations, one mainframe and four process chambers.

According to the invention, the third machine 403 and the fourth machine 404 are grouped into a second machine group, according to this exemplary embodiment of a second machine type, as represented in FIG. 9b.

The third machine 403 and the fourth machine 404 are multi-process installations of the type P5000 with two process chambers, a P5000™ mainframe and two loading stations.

The third machine 403 has the following components of the respective following component type:
   a first loading station 921 of the component type A,
   a second loading station 922 of the component type B,
   a P5000 mainframe MF 923 as component_2, that is to say as a second machine type mainframe component,
   a first process chamber B 924, set up as a depositing process chamber (component_3), and
   a second process chamber D 925, set up as a back-etching process chamber (component_4).

The fourth machine 404 has the following components:
   a first loading station 931 of the component type A,
   a second loading station 932 of the component type B,
   a P5000™ mainframe MF 933 as component_2,
   a first process chamber A 934, set up as a depositing process chamber as machine component_3,
   and a second process chamber C 935, set up as a back-etching process chamber as machine component_4.

As the statements made above reveal, the third machine and the fourth machine 403 and 404 are grouped into a machine group (of the same machine type), since the mainframe is the same with regard to the required functionality, so that it is quite possible for the generated raw data to be considered together with regard to the desired monitored data and their analysis.

According to the invention, the fifth machine 405, the sixth machine 406 and the seventh machine 407 are grouped into a third machine group, according to this exemplary embodiment of a third machine type, as represented in FIG. 9c.

The machines of the third machine type are in each case a single-chamber installation with in each case one process chamber and only one loading station.

The fifth machine 405 has a loading station 941 and a process chamber 942, set up as a depositing process chamber (component_3).

The sixth machine 406 likewise has a loading station 951 and a process chamber 952, likewise set up as a depositing process chamber (component_3).

The seventh machine 407 has a loading station 961 and a process chamber 962, likewise set up as a depositing process chamber (component_3).

It should be noted in this connection that the assignment of the respective machine component to a machine component type (for example component_2, component_3, component_4) is a physical interpretation of a skilled person of the respective machine, which takes into account the corresponding specification of the machine 401, 402, 403, 404, 405, 406, 407. It should be noted that the assignment may also be performed in an automated manner.

As represented in FIG. 10, according to the invention different grouping possibilities within a machine group come into consideration.

According to this exemplary embodiment, the machines are grouped from the aspect of the machine itself or from the aspect of the component type.

If the machines are grouped from the aspect of the respective machine itself and its properties, the following grouping criteria are considered in particular:
   raw data recording per machine,
   machine-specific problems,
   prior or subsequent process on a machine.

If the machines are grouped with regard to the component types contained in the respective machine, the following objectives are considered in particular:
   the identical configuration for an identical component type in each case,
   the comparison of identical component types over different machines.

FIG. 10 illustrates the different grouping possibilities according to this exemplary embodiment of the invention.

FIG. 11 shows in a grouping table 1100 an assignment of machines 1101, machine types 1102, machine components 1103 and machine component types 1104 within a machine group.

It should be noted in this connection that the assignment can be performed both in an automated manner, by using corresponding computer programs, which can automatically evaluate the common aspects and differences of the machines, of the machine components or of the data generated by the latter, and also manually by a skilled person, who interprets the respective machines and machine components or the data generated by the latter.

FIG. 11 further shows in the grouping table 1100 parameter sets 1105, recipe sets 1106 and characteristic value sets 1107 respectively assigned to the machines, which are explained in still more detail below.

Before a definition of the characteristic values is possible, differences in parameter names and in physical units which are used by integrated and/or external sensors are corrected by means of an allocation table.

According to this exemplary embodiment, one parameter set is used per machine component. In other words, different machine component types are assigned different parameter sets. However, a number of components may refer to the same parameter set. Depending on how differently the machines respectively name and log identical parameters, there are correspondingly more or fewer parameter sets in the respective grouping table 1100.

According to this exemplary embodiment, the following parameters are recorded by each machine 201 per unit of time, preferably per second:
   a time indication;
   for a mainframe, if present, the pressure prevailing in the transfer chamber of the mainframe,
   and for all process chambers additionally:
   a recipe step number of the recipe currently in progress in the chamber,
   for the depositing chambers additionally:
   an indication of the gas flow prevailing in the depositing chamber, and
   an indication of the chamber pressure prevailing in the depositing chamber,
   for the back-etching chambers:
   an indication of the power fed into the respective back-etching chamber,
   an indication of the power reflected by the respective back-etching chamber.

In FIG. 12a to FIG. 12g there are for the respective machines 401, 402, 403, 404, 405, 406, 407 the respective raw data parameters 1201, the component types 1202 to which the raw data parameter indication 1201 relates and also the indication of the respective parameter sets 1203 to which the respective raw data parameter indication 1202 relates.

To explain the interrelationships represented in FIGS. 12a to 12g, some basic aspects of the assignments and illustrations are briefly explained below.

For instance, all the parameters which are necessary in the configuration of chamber-subsuming characteristic values have the same raw data parameter names for the first machine 401 and for the second machine 402.

Figure 12A:
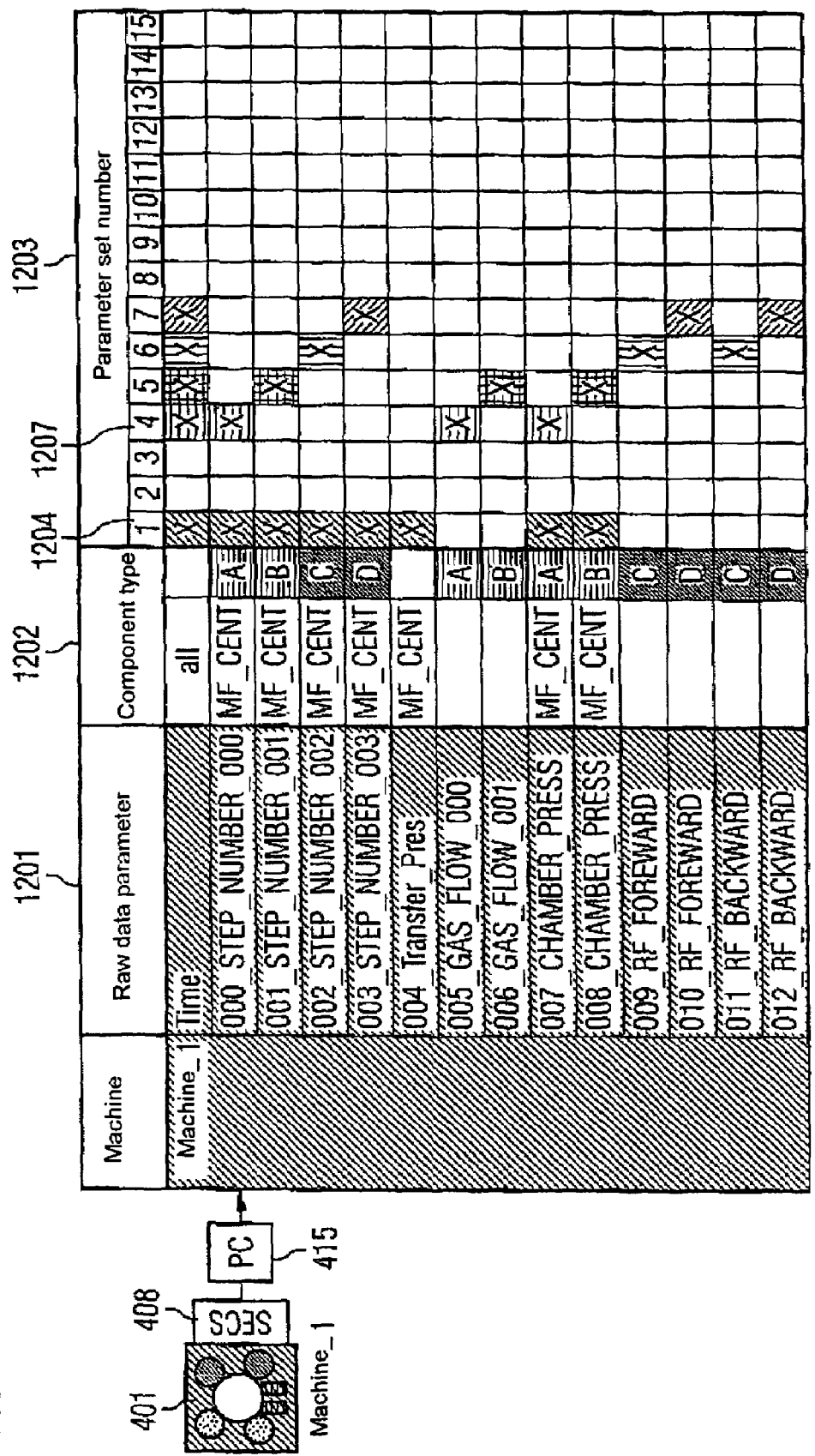
Figure 12B:
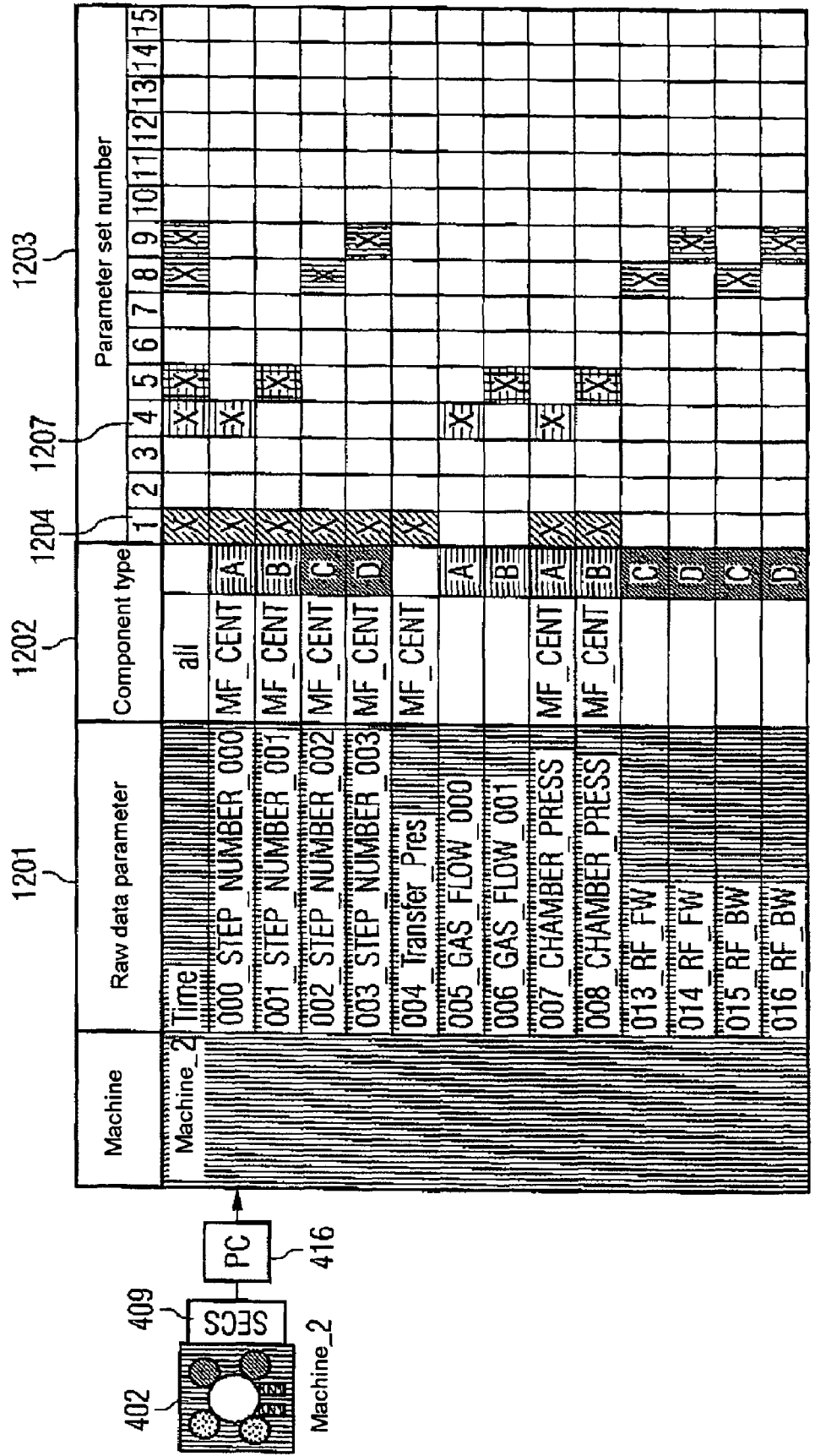

For this reason, the mainframe component of the first machine 401 and the mainframe component of the second machine 402 refer to the same parameter set, that is to say the first parameter set 1204 (cf. FIG. 12a and FIG. 12b).

According to this exemplary embodiment, all the parameters which are necessary in the configuration of chamber-subsuming characteristic values have different raw data parameter names for the third machine 403 and the fourth machine 404.

Figure 12C:
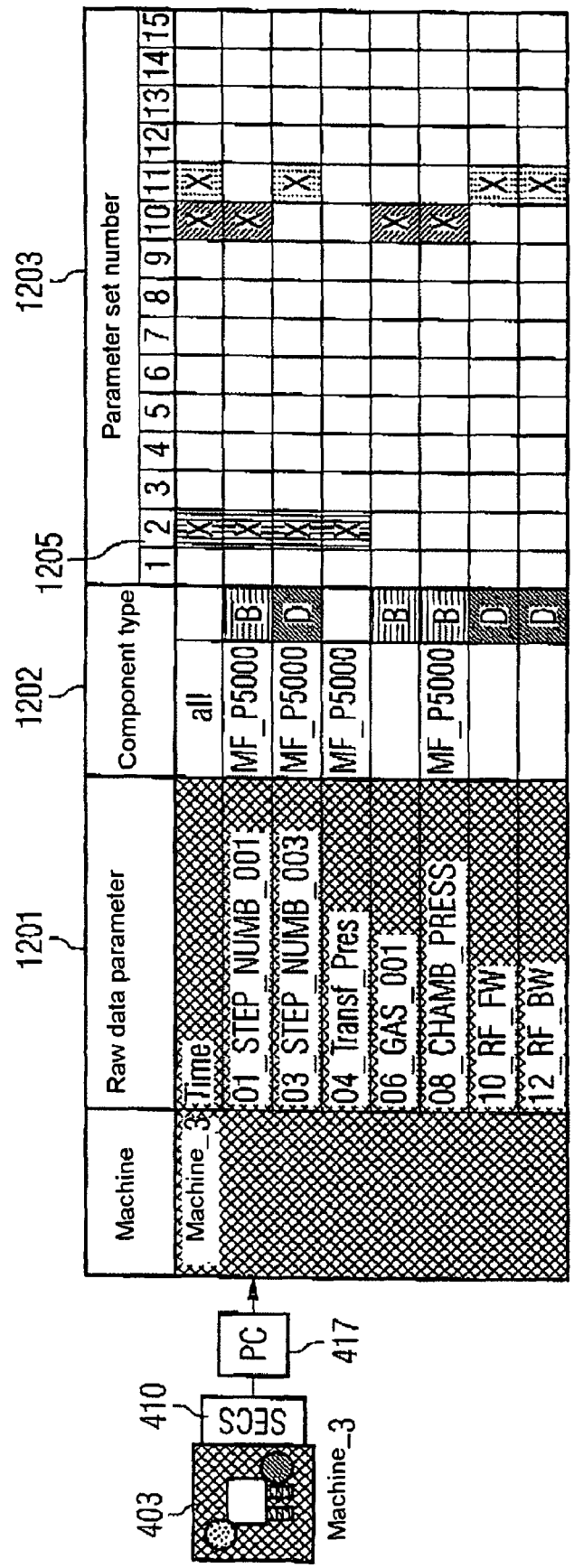
Figure 12D:
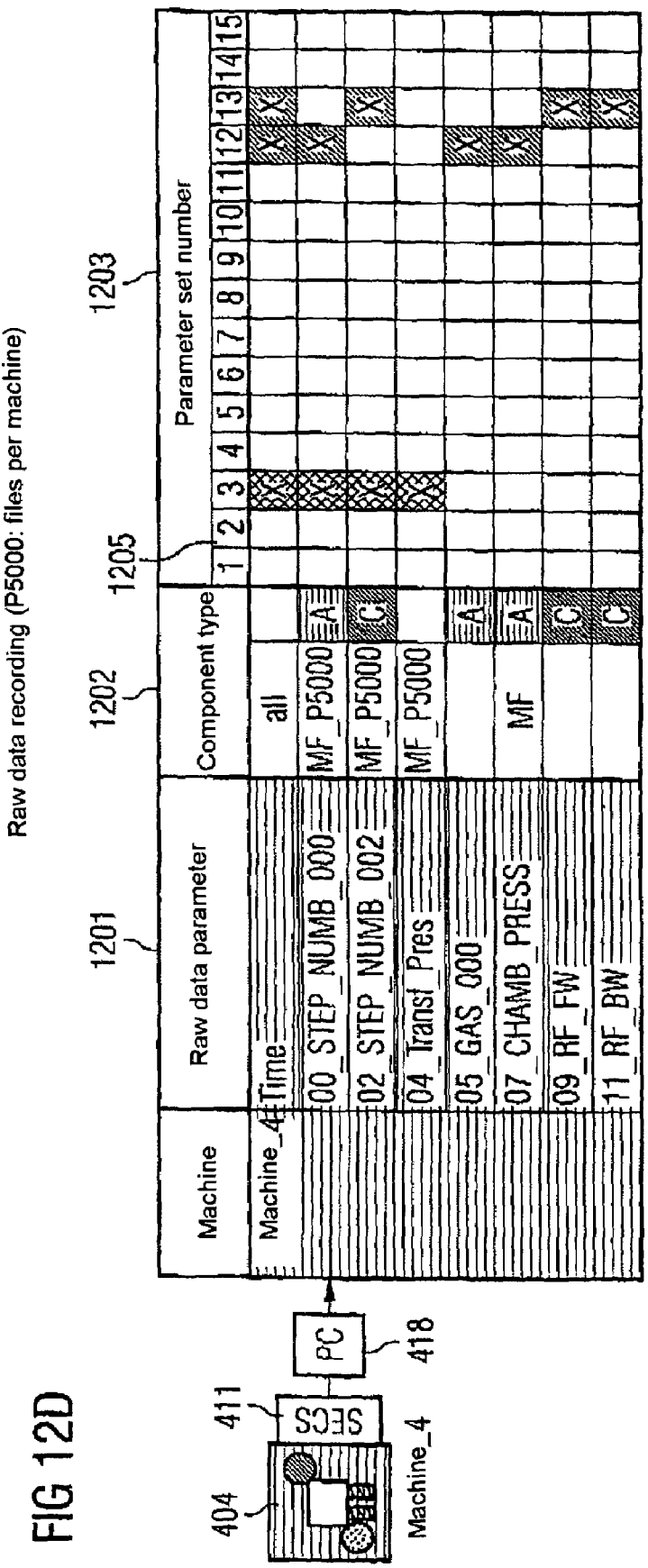

For this reason, the mainframe component of the third machine 403 refers to a second parameter set 1205 and the mainframe component of the fourth machine 404 refers to a third parameter set 1206 (cf. FIG. 12c and FIG. 12d).

The first process chamber A 904 of the first machine 401 and the first process chamber A 914 of the second machine 402 are both set up as depositing process chambers and use, i.e. log, the same raw data parameter names. Consequently, the first process chamber A of the first machine 401 and the first process chamber A of the second machine 402 refer to the same parameter set, that is to say to a fourth parameter set 1207 (cf. FIG. 12a and FIG. 12b).

The assignment of different raw data parameters to different parameter sets or identical raw data parameters to identical parameter sets and their corresponding re-naming as a common parameter is machine-dependent and can be performed automatically or manually by a skilled person.

The further interrelationships and the references to the further parameter sets take place in the same way, represented above, and for this reason are not explained in any more detail.

Consequently, with corresponding assignment of the individual machine components to the individual parameter sets, the grouping table 1300 represented in FIG. 13 is obtained.

According to this exemplary embodiment, the raw data parameter names for all the machine types/machines are re-named in the following manner. A distinction is drawn here between process-chamber-related raw data parameter names and process-chamber-subsuming raw data parameter names.

The process-chamber-related raw data parameter names are re-named in the following manner:

Common features and differences are also determined for different recipes of a process chamber type and used according to the invention to achieve a further compression of the raw data.

It should be noted in this connection that different recipe names can also be used for the same recipes.

Figure 17B:
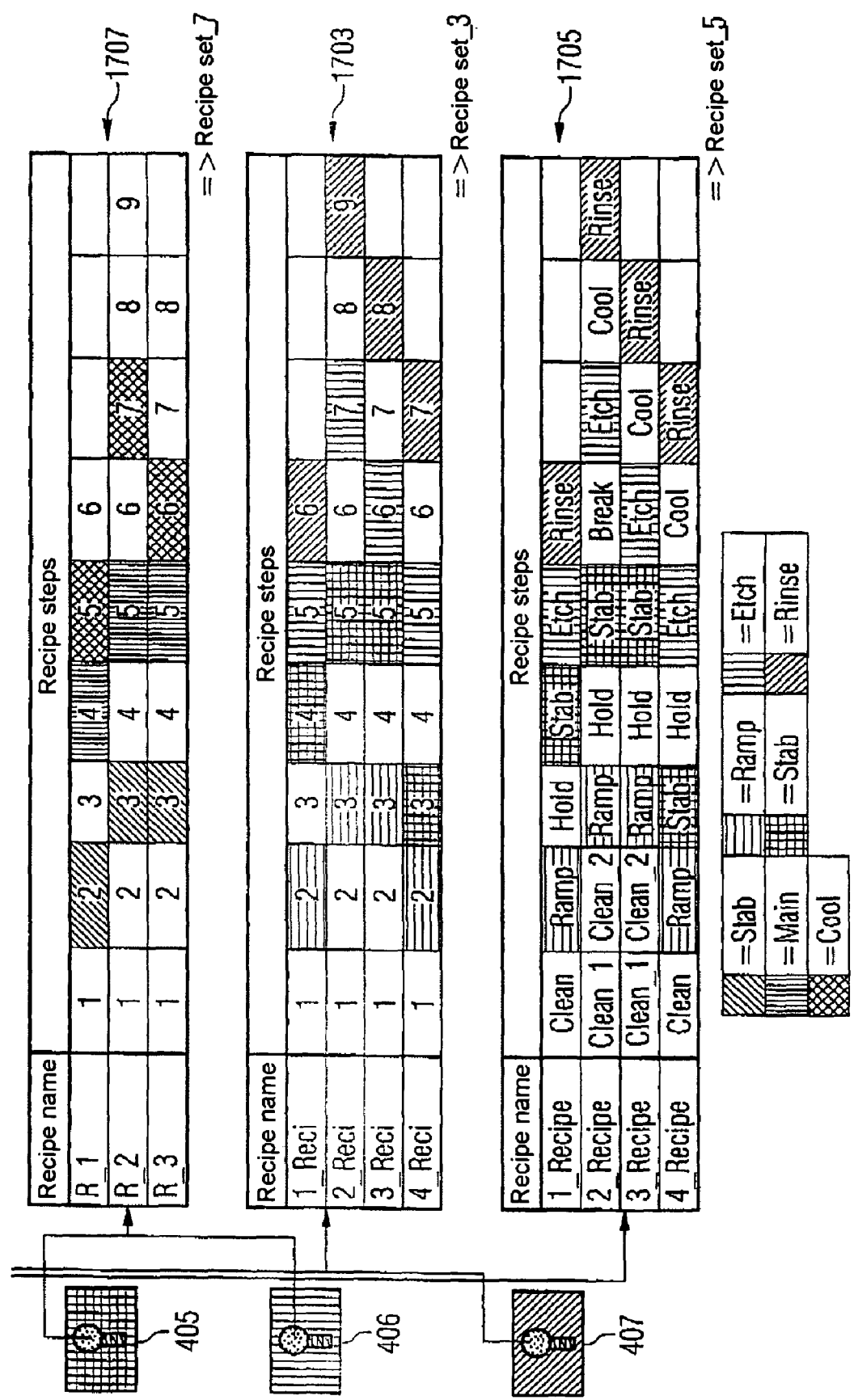
FIG. 17 shows a block diagram and tables in which all the recipes used according to this exemplary embodiment in this machine group during a manufacturing process of semiconductor chip production are represented.

FIG. 17 shows in tables seven recipe sets 1701, 1702, 1703, 1704, 1705, 1706, 1707 and the assignment of the respective process chambers of the machines 401, 402, 403, 404, 405, 406, 407 to the recipes which are carried out in the respective process chambers.

According to the invention, the common features of recipes are brought together as generalized recipe steps in the recipe table 1800 represented in FIG. 18. The recipe step numbers or

--- time → TIME
recipe step identification indication, preferably recipe step number of the recipe currently in progress in the process chamber → STEP,
the indication of the gas flow prevailing in the process chamber
→ GAS,
the indication of the chamber pressure prevailing in the process chamber
→ PRESSURE,
the indication of the power fed into the process chamber
→ POWER-FW,
the indication of the power reflected by the process chamber
→ POWER-BW.
The process-chamber-subsuming raw data parameter names are mapped as follows:
time → TIME,
recipe step identification indication, preferably recipe step number of the recipe currently in progress in the process chamber
→ STEP_A, STEP_B, STEP_C, STEP_D
the chamber pressure prevailing in the chamber
→ PRESSURE_A, PRESSURE_B
the pressure prevailing in the transfer chamber
→ TRANSFER_PRESSURE.

---

This mapping is represented in the tables in FIG. 14, FIG. 15 and FIG. 16, in which the raw data parameter names 1401 of a parameter set 1400 are mapped onto the APC parameter names 1402 presented above.

Consequently, the parameter sets represented in FIG. 14, FIG. 15 and FIG. 16 respectively represent the mapping carried out of the raw data parameter names provided in the parameter sets onto the APC parameter names used, as set out above.

In this way, a considerable reduction in the parameter names used is achieved, without information content being lost in the analysis of the raw data determined.

The processing of a wafer or a number of wafers at the same time in a process chamber of a machine 401, 402, 403, 404, 405, 406, 407 usually proceeds in one or more process steps.

The process steps required for processing a wafer or a number of wafers at the same time are combined into recipes.

Each process step, that is to say each recipe step, has a recipe step number uniquely assigned respectively to the recipe step and characterizing it. Alternatively, the recipe step may be assigned a description, likewise uniquely identifying the recipe step.

The recipe number or the recipe description is written at the same time in the raw data file as the parameter "STEP". In a process chamber of a machine 401, 402, 403, 404, 405, 406, 407, different numbers of recipes proceed, usually between 5 and 10 in a chip production installation 200 for the manufacture of memory chips and usually 50 to 100 different recipes in a chip production installation 200 for the manufacture of logic chips.

the recipe step descriptions are generally assigned to recipe steps and consequently combined into recipe groups, i.e. a respective recipe set. It should be noted in this connection that different recipe sets may have the same generalized recipe names, for example recipe set_1, recipe set_2, . . . , recipe set_7, and can contain the generalized recipe steps, for example "Stab", "Main", "Cool".

FIG. 19 shows the recipe assignment to the respective recipe sets for all the depositing process chambers of the machine group according to an exemplary embodiment of the invention.

This assignment can also be performed in an automated manner or else manually by a skilled person with knowledge of the recipes respectively used and the properties of the machines and process chambers used.

FIG. 19 shows the recipe configuration for all the depositing process chambers of the machine group.

For the purposes of illustration, part of the assignment and the principle on which the assignment is based are briefly explained below.

For the first process chamber A of the first machine 401, the "main step" of the recipe "Reci_1" is the recipe step number 3, but in the case of the recipe "Reci_3" it is the recipe step number 4. In the case of another machine, the main step of all the recipes is designated by "MAIN". The assignment of which recipe step is the respective main step of the recipe can likewise be performed in an automated manner by using corresponding prior knowledge or manually by a skilled person on the basis of a physical interpretation of the respective process step.

It is now possible by means of the allocation tables 1901, 1902, 1903, 1904, 1905 represented in FIG. 19 to define characteristic values recipe-independently, in that reference is made to the generalized recipe steps. With the aid of the recipe tables, that is to say the allocation tables 1901, 1902, 1903, 1904, 1905, the generalized recipe step is stored in a uniquely identifiable manner for each recipe listed there.

On different machines, the same recipes may be designated differently.

With the aid of the recipe tables 1901, 1902, 1903, 1904, 1905, it is possible according to the invention to re-name these recipe names in such a way that the same recipes which are carried out on different machines are designated in the same way; generally this means that recipe-meta-designations are graphically being introduced, also referred to hereafter as APC recipes.

The imaging and the assignment of a machine-specific recipe to an APC recipe is in turn possible in an automated manner or can be performed by a physical interpretation by a skilled person.

The further steps represented in the allocation tables 1901, 1902, 1903, 1904, 1905 are those of the stabilization of the conditions in a process chamber ("STAB") and the phase of cooling down the process chamber after the main step has been carried out ("COOL").

The recipe configuration is performed in a corresponding way for the recipes presented in FIG. 20, which are carried out in the back-etching process chambers of the machine group.

The process steps carried out and the corresponding mapping specifications are presented in the allocation tables 2001, 2002. The method steps of bringing the process chamber up to process conditions ("RAMP"), stabilizing the process conditions in the process chamber ("STAB"), etching as the main step of the recipe proceeding in the process chamber ("ETCH"), and the returning of the state of the process chamber to the normal state ("RINSE") are represented in particular.

Consequently, for back-etching process chambers according to this exemplary embodiment, three generalized recipe steps are defined (STAB, MAIN, COOL) and for depositing process chambers four general recipe steps (RAMP, STAB, ETCH, RINSE) are provided.

Many identical recipes with different machine-specific recipe names were reduced according to the invention for the depositing process chambers to three different ABS recipe names (according to this exemplary embodiment, a reduction takes place from 8 machine-specific recipe names to three APC recipe names): COMP_3_RECIPE_1, COMP_3_RECIPE_2, COMP_3_RECIPE_3;

for back-etching process chambers to four different APC recipe names, that is to say COMP_4_RECIPE_1, COMP_4_RECIPE_2, COMP_4_RECIPE_3, COMP_4_RECIPE_4.

Consequently, according to the invention, a considerable reduction is also made possible with regard to the recipes and recipe names used. In this way, with appropriate grouping, the machine components of the same type with the same parameter sets and the same recipe set, which can be fed together to an analysis configured in the same way, can be combined into an identical characteristic value set.

According to this exemplary embodiment of the invention, the assignment of machines, machine types, machine components and machine component types, parameter sets, recipe sets to the respective characteristic value sets are represented in a corresponding allocation table 2100 in FIG. 21.

FIG. 22 shows the corresponding characteristic value configuration for the machine component_1 and the machine component_2 in the case of two different mainframes.

As the allocation table 2200 in FIG. 22 reveals, the respectively determined and grouped data are subjected to a statistical analysis, for example checking whether the values to be monitored lie within a predetermined admissibility interval of the monitored values, or a mean-value determination of the determined values and monitoring of the respective specific mean value with regard to the admissibility of the value compared with predetermined prescribed criteria. In the allocation table 2200 it is determined how compressed characteristic values are generated from the raw data, i.e. the production sub-data (data per time interval), for example the statistical mean value of a parameter in a specific recipe step, the statistical variability of this parameter in a specific recipe step, etc.

A standard deviation for the values to be monitored can also be determined and the standard deviation can be compared with predetermined prescribed criteria.

If the determined values according to the algorithm used deviate from the prescribed criteria, an alarm message can be generated by an alarm-generating unit additionally provided and can be displayed to the user on the client computer 312, in which alarm-generating unit alarm-generating criteria which are applied by the alarm-generating unit are also stored.

Further characteristic value configurations and the statistical analyses are also represented for a back-etching process chamber in the configuration table 2300 in FIG. 23 and for a depositing process chamber in the configuration table 2400 in FIG. 24.

A brief summary of the achievable compression on production data is set out below:

According to the exemplary embodiment, seven machines which are grouped into one machine group are provided in the semiconductor production installation. According to this exemplary embodiment, between four and seven different recipes proceed on each machine, and for their part respectively have between three and four significant recipe steps. Between four and 14 different raw data parameters are acquired and written at the same time per machine.

The following reduction is obtained by means of the previously described different allocation tables of the configuration of characteristic values:

a reduction of the parameters from 37 to 13,
a reduction of the recipe names from 18 to 7,
a reduction of the recipe steps from 53 to 7,
a reduction of characteristic value tables from 19 to 3.

This leads to an overall reduction from 670,662 parameters to be acquired and to be monitored (37*18*53*19) to now, according to the invention, only 1,911 parameters to be monitored (13*7*7*3).

For a customary semiconductor chip production installation, in the case of which it is assumed that 50 raw data parameters are used in the case of three different software versions, and also 50 recipes with 10 to 15 significant recipe steps (in the case of two different machine types, 50 completely different recipes) and also with 15 machines in a production installation (4-process-chamber machines and with two different process chambers), there is a reduction of data to be monitored of approximately 10,000:1.

The following publication is cited in this document:
[1] U.S. Pat. No. 5,777,876

The invention claimed is:

1. An Advanced Process Control method for acquiring, analyzing and monitoring production data in a production installation having one or more production sub-installations, the method comprising:

determining and storing production sub-data comprising a plurality of sensor values, wherein each sensor value is associated with a machine, a machine component, a manufacturing recipe, a manufacturing parameter, or a combination thereof;

grouping each sensor value of the plurality of sensor values into a sub-data group;

calculating a characteristic value for the sub-data group from the sensor values of the sub-data group wherein the characteristic value comprises information about the magnitudes of the sensor values of the sub-data group; and using the characteristic value to analyze and monitor the production data;

wherein the sub-data group represents a machine group, a machine component group, a manufacturing recipe group, a parameter group, or a combination thereof, and wherein:

the machine group comprises a grouping of different machines of the production sub-installations that are similar according to a machine similarity criterion;

the machine component group comprises a grouping of different machine components of the production sub-installations that are similar according to a machine component similarity criterion;

the recipe group comprises a grouping of different manufacturing recipes that are similar according to a recipe similarity criterion;

the parameter group comprises a grouping of different manufacturing parameters that are similar according to a parameter similarity criterion; and wherein a sensor value is grouped into a sub-data group if the sensor value is associated with the machine, machine component, manufacturing recipe, manufacturing parameter, or combination thereof that is represented by the sub-data group.

2. The Advanced Process Control method as claimed in claim 1, which further comprises transmitting the production sub-data from a production sub-installation to a central memory; and storing the production sub-data in the central memory in at least one central file.

3. The Advances Process Control method as claimed in claim 1, which further comprises subjecting the sub-data group to a statistical analysis.

4. The Advanced Process Control method as claimed in claim 1, wherein the Advanced Process Control method is used in chip production.

5. An Advanced Process Control system for acquiring, analyzing and monitoring production data in a production installation comprising:

one or more production sub-installations determining and storing production sub-data comprising a plurality of sensor values, wherein sensor element is associated with a machine, a machine component, a manufacturing recipe, a manufacturing parameter, or a combination thereof;

an evaluation computer configured to group each sensor element of the plurality of sensor elements into a sub-data group;

the evaluation computer further configured to calculate a characteristic value for the sub-data group from the sensor values of the sub-data group wherein the characteristic value comprises information about the magnitudes of the sensor values of the sub-data group; and an analysis and monitoring device configured to use the characteristic value to analyze and monitor the production data;

wherein the sub-data group represents a machine group, a machine component group, a manufacturing recipe group, a parameter group, or a combination thereof, and wherein:

the machine group comprises a grouping of different machines of the production sub-installations that are similar according to a machine similarity criterion;

the machine component group comprises a grouping of different machine components of the production sub-installations that are similar according to a machine component similarity criterion;

the recipe group comprises a grouping of different manufacturing recipes that are similar according to a recipe similarity criterion;

the parameter group comprises a grouping of different manufacturing parameters that are similar according to a parameter similarity criterion; and wherein the evaluation computer is configured to group a sensor value into a sub-data group if the sub-data element is associated with the machine, machine component, manufacturing recipe, manufacturing parameter, or combination thereof that is represented by the sub-data group.

* * * * *